United States Patent
Mollicone et al.

(10) Patent No.: US 8,712,827 B2
(45) Date of Patent: Apr. 29, 2014

(54) NORMALIZED CONTEXTUAL PERFORMANCE METRIC FOR THE ASSESSMENT OF FATIGUE-RELATED INCIDENTS

(75) Inventors: Daniel J. Mollicone, Philadelphia, PA (US); Christopher G. Mott, Seattle, WA (US); Kevin Gar Wah Kan, Philadelphia, PA (US); Michael D. Stubna, Philadelphia, PA (US)

(73) Assignee: Pulsar Informatics, Inc., Philadelphia, PA (US)

( * ) Notice: Subject to any disclaimer, the term of this patent is extended or adjusted under 35 U.S.C. 154(b) by 0 days.

(21) Appl. No.: 13/370,288

(22) Filed: Feb. 9, 2012

(65) Prior Publication Data

US 2012/0203464 A1 Aug. 9, 2012

Related U.S. Application Data

(60) Provisional application No. 61/462,885, filed on Feb. 9, 2011.

(51) Int. Cl.
*G06Q 10/00* (2012.01)
*G06Q 30/00* (2012.01)

(52) U.S. Cl.
USPC ...................................................... 705/7.38

(58) Field of Classification Search
USPC ................................. 705/7.28, 7.38
See application file for complete search history.

(56) References Cited

U.S. PATENT DOCUMENTS 5,465,079 A * 11/1995 Bouchard et al. ............. 340/576
5,615,138 A * 3/1997 Tanaka et al. .................... 702/81
6,241,686 B1 * 6/2001 Balkin et al. ................... 600/544
2005/0177031 A1 * 8/2005 Hursh ............................ 600/300
2006/0200008 A1 * 9/2006 Moore-Ede ................... 600/300
2007/0066874 A1 * 3/2007 Cook ............................. 600/300
2007/0250286 A1 * 10/2007 Duncan et al. ................ 702/139
2009/0132332 A1 * 5/2009 Belenky et al. ................... 705/9
2012/0010488 A1 * 1/2012 Henry et al. .................. 600/365

OTHER PUBLICATIONS

Mathias Basner and Joshua Rubenstein. "Fitness for Duty: A 3-Minute Version of the Psychomotor Vigilance Test Predicts Fatigue-Related Declines in Luggage-Screening Performance" 53:10 J. Occ & Envir. Med. 1146-1154. (Am. Col. Occ. & Environ. Med. Oct. 2011).*
Drew Dawson. "modeling Fatigue and the Use of Fatigue Models in Work Settings" 43 Accident Analysis and Prevention. pp. 549-564 (Elsevier 2011).*

(Continued)

*Primary Examiner* — Beth V Boswell
*Assistant Examiner* — Stephanie Delich
(74) *Attorney, Agent, or Firm* — Damian M. Biondo, Esq.

(57) ABSTRACT

A normalized contextual performance metric quantifies the susceptibility of fatigue-related risk in a fatigue environment with activities conducted within a fatigue level range of interest. Fatigue incidents are quantified by one of a plurality of values associated with fatigue-incident measurement. Activities are quantified by one of a plurality of values associated with activity measurement. A normalized contextual performance metric is determined by identifying a fatigue level range of interest, summing all values of incidents occurring at the fatigue level range of interest, summing all values for relevant activities occurring at the fatigue level range of interest, and then dividing the first sum by the second. The normalized contextual performance metric thereby allows operational managers to assess risk of fatigue incidents by monitoring activities and fatigue levels within the fatigue environment.

36 Claims, 14 Drawing Sheets

(56) References Cited

OTHER PUBLICATIONS

David F. Dinges. "An Overview of Sleepiness and Accidents" 4:2 J. Sleep Res. pp. 4-14. (Eur. Sleep Res. Socy 1995).*

Jillian Dorrian, Margaret Sweeney, and Drew Dawson. "Modeling Fatigue-Related Truck Accidents: Prior sleep duration, recency, and continuity" 9 Sleep and Biological Rhythms, pp. 3-11 (Jap. Socy of Sleep Res. 2011).*

Jaques Reifman. "Alternative Methods for Modeling Fatigue and Performance" vol. 75, No. 3, Section II Aviation, Space and Environmental Medicine. Mar. 2004.*

Jane C. Stutts. "Driver Risk Factors for Sleep-Related Crashes" 35 Accident Analysis and Prevention. pp. 321-331 (2003).*

Hans P. Van Dongen. "Comparison of Mathematical Model Predictions to Experimental Data of Fatigue and Performance" vol. 75, No. 3, Section II Aviation, Space and Environmental Medicine. Mar. 2004.*

Hans P. Van Dongen. "Shift Work and Inter-Individual Differences in Sleep and Sleepiness" 23:6 Chronobiology International pp. 1139-1147 (Informa Healthcare 2006).*

Ann Williamson. "The Link Between Fatigue and Safety" 43 Accident Analysis and Prevention, pp. 498-515 (2011).*

\* cited by examiner

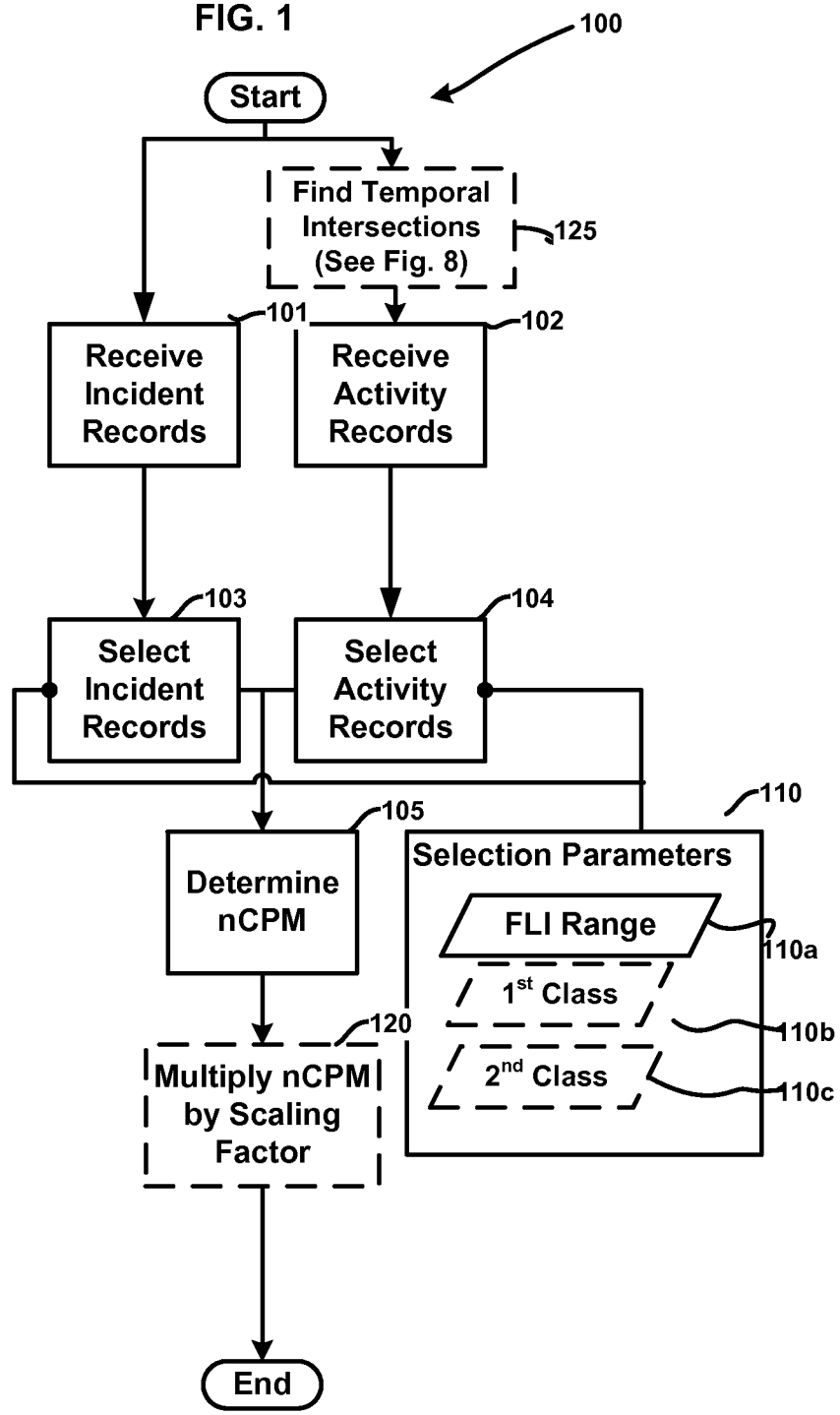

Activity Records:

| 351 | Record 1: | AV=3, AFL=H, AT=A, AE=F |
|---|---|---|
| 352 | Record 2: | AV=1, AFL=H, AT=B, AE=F |
| 353 | Record 3: | AV=1, AFL=H, AT=B, AE=D |
| 354 | Record 4: | AV=1, AFL=L, AT=B, AE=D |
| 355 | Record 5: | AV=1, AFL=L, AT=A, AE=D |
| 356 | Record 6: | AV=1, AFL=L, AT=B, AE=D |

IO = Incident Occurrence
AO = Activity Occurrence

FIGURE 6

$N_{BL}$ = # of Baseline Individuals
$N_I$ = # of Incident-Related Individuals
$N_{WF}$ = # of Individuals in entire Workforce $T_{BL}$ = Duration of monitoring period of Baseline Individuals
$T_I$ = Duration of monitoring period of Incident-Related Individuals
$T_{WF}$ = Duration of monitoring period of entire Workforce

Four Relationships

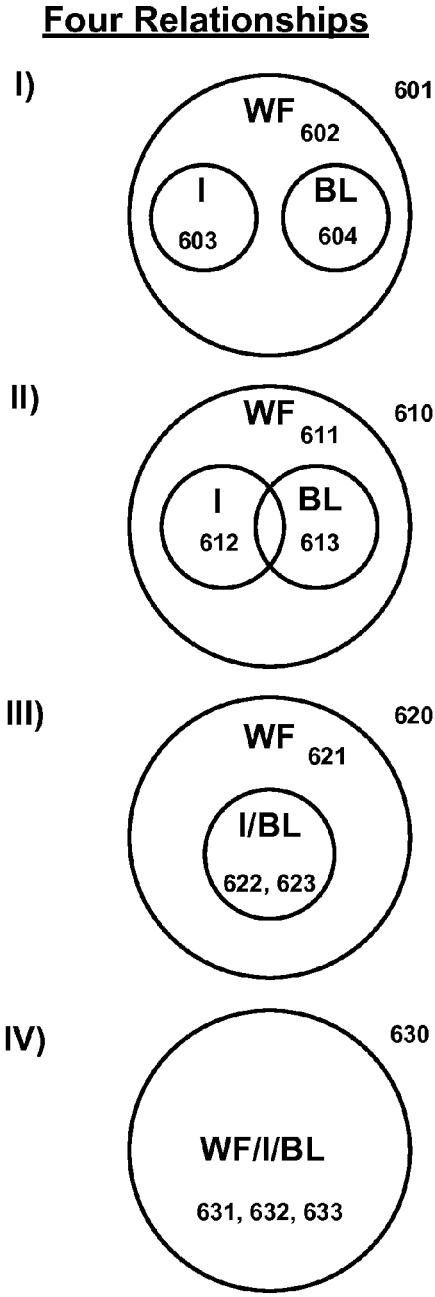

Scaling Factors $$\frac{N_{BL}}{N_I} = \text{Baseline-to-Incident Ratio} \quad /640$$

$$\frac{T_{BL}}{T_I} = \text{Baseline-to-Incident Temporal Ratio} \quad /660$$

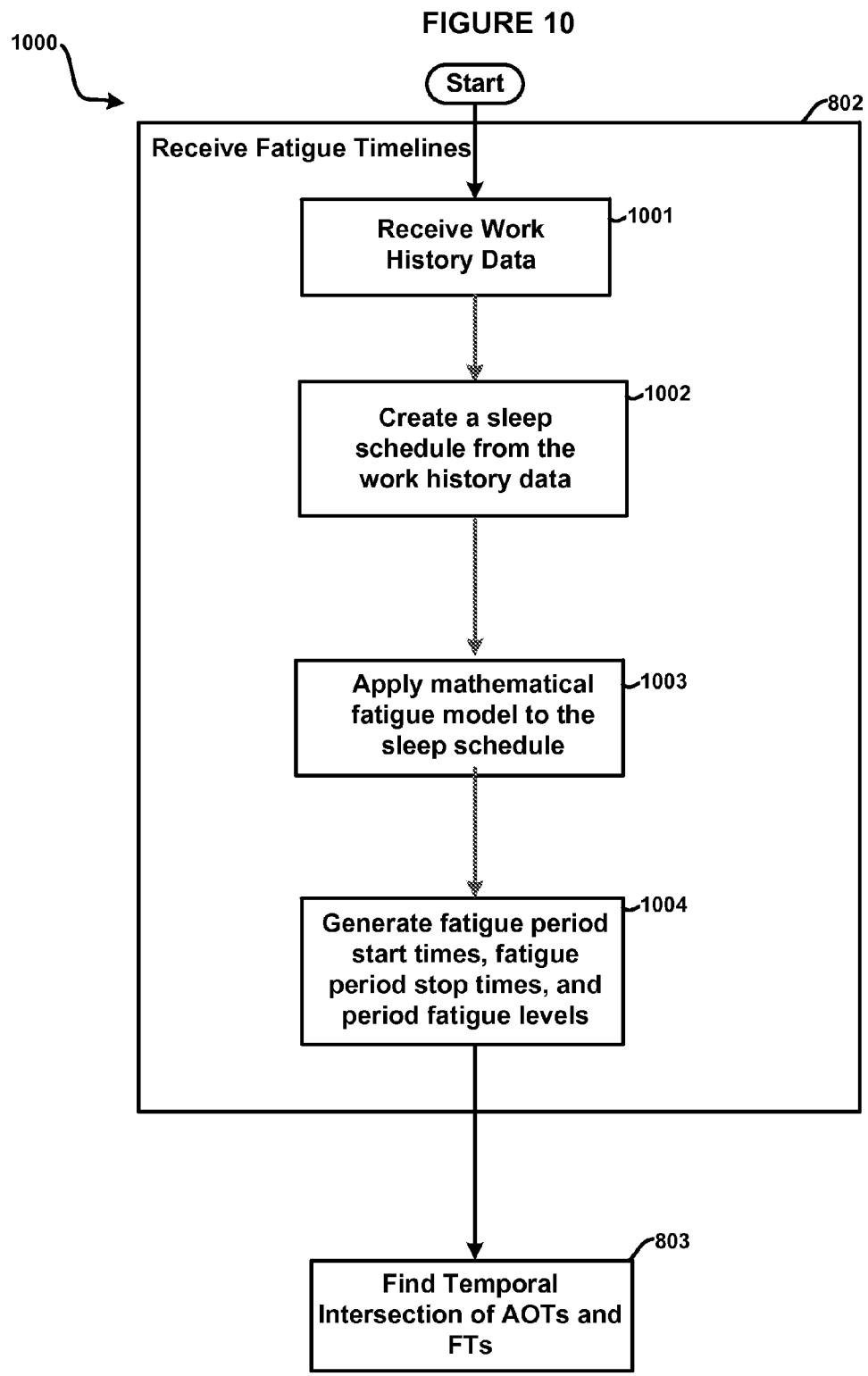

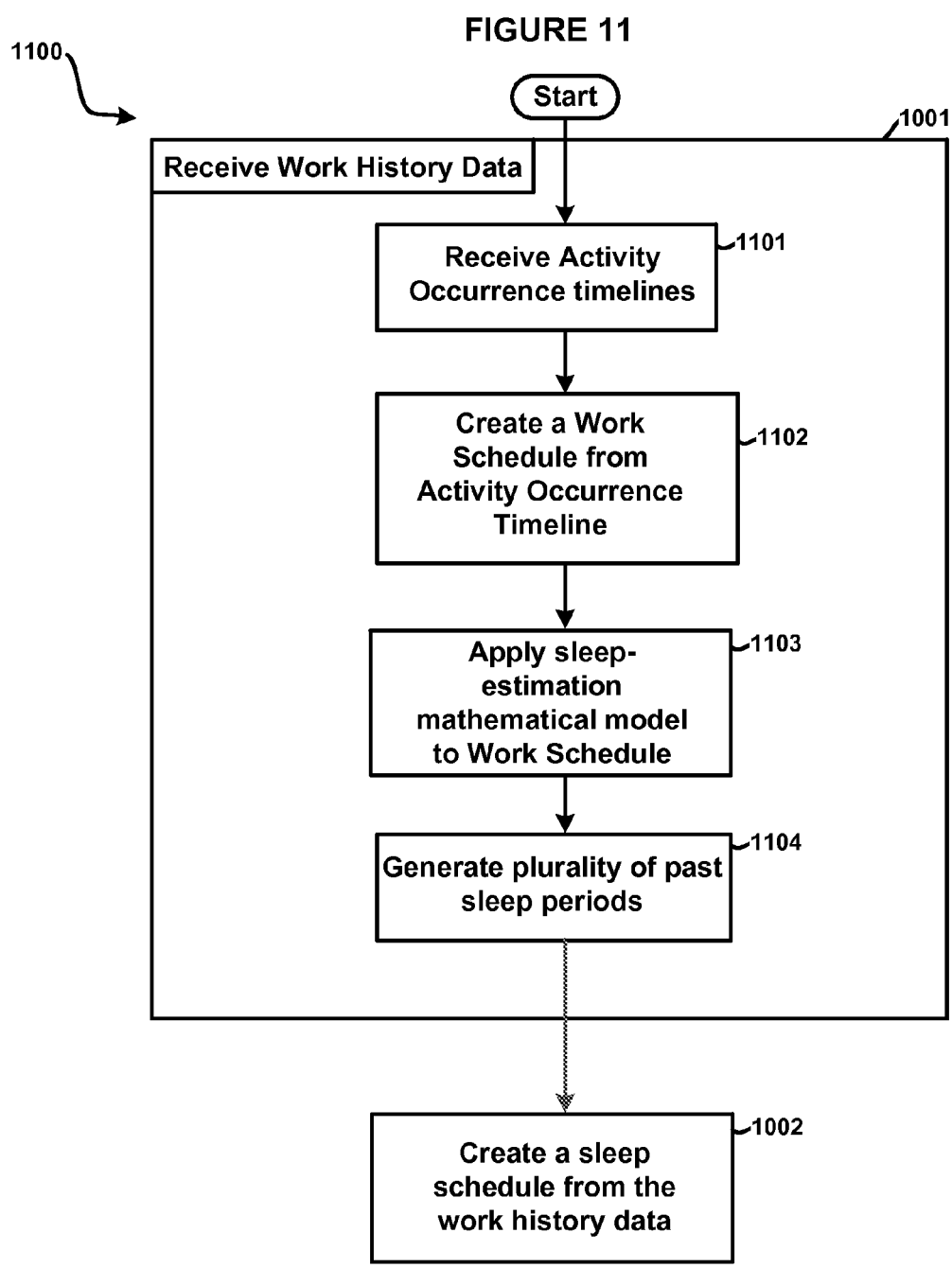

NORMALIZED CONTEXTUAL PERFORMANCE METRIC FOR THE ASSESSMENT OF FATIGUE-RELATED INCIDENTS

RELATED APPLICATIONS

This application claims benefit of the priority of U.S. application No. 61/462,885 filed Feb. 9, 2011, which is hereby incorporated herein by reference.

STATEMENT OF GOVERNMENT FUNDED RESEARCH

This invention was made with government support under Contract No. DTFAAC-10-C-00062 awarded by the Federal Aviation Administration. The government has certain rights in the invention.

TECHNICAL FIELD

The present invention relates to systems and methods for assessing contextual performance within a work environment or other environment where fatigue may be relevant. In particular embodiments, one or more metrics associated with a fatigue-related incident occurring within the environment are normalized to a sum of activities occurring within the environment, when those activities are conducted within a fatigue level range of interest corresponding to the fatigue level at which the incident occurred. The result is referred to as a "normalized contextual performance metric," or "nCPM."

BACKGROUND

Workplace fatigue is a considerable source of concern for operational managers, particularly in work environments where the impact of fatigue-related incidents can be extreme. Fatigue-related incidents carry with them a broad array of consequences, including (but not limited to) loss of workplace production and efficiency, property and equipment damage, physical injury and loss of human life, adverse environmental impacts, decreased customer satisfaction and loss of customer base, decreased workplace morale and loss of general goodwill to business, legal and regulatory liabilities, and/or the like. When appropriately quantified, these consequences (by way of non-limiting example) may be considered "incident values." There is a general desire to manage these types of consequences.

SUMMARY

Particular embodiments of the presently disclosed invention aim to assist operational managers and/or other users to assess the risk and cost of fatigue-related incidents relative to operational activities conducted within a particular fatigue-level range. Subsequent operational activities within the fatigue-level range may then be managed accordingly. One aspect of the invention provides a method for determining an nCPM. The nCPM is determined by finding the sum of all incident values for incidents occurring within a fatigue-level range of interest and dividing that sum by the sum of all activity values for activities occurring within the same fatigue level range of interest.

One particular aspect of the invention provides a method for determining an nCPM. The method comprises: providing, at a computer, one or more incident records, wherein each incident record represents an incident occurrence and is parameterized by: an incident value that is based on at least one measurable characteristic of the incident occurrence; and an incident fatigue level that is based on a neurobehavioral state of one or more individuals associated with the incident occurrence; providing, at the computer, one or more activity records, wherein each activity record represents an activity occurrence and is parameterized by: an activity value that is based on at least one measurable characteristic of the activity occurrence; and an activity fatigue level that is based on a neurobehavioral state of an individual associated with the activity occurrence; selecting one or more activity records from among the provided activity records, wherein the selected activity records are parameterized by activity fatigue levels within a fatigue level range of interest; selecting one or more incident records from among the provided incident records, wherein the selected incident records are parameterized by incident fatigue levels within the fatigue level range of interest; and determining a normalized contextual performance metric for the fatigue level range of interest, the normalized contextual performance metric comprising a sum of the incident values of the selected incident records divided by a sum of the activity values of the selected activity records.

Another particular aspect of the invention provides a method for determining an nCPM that assesses the impact of fatigue on performance. The method comprises: providing, at a computer, one or more incidents, wherein each incident is parameterized by: an incident value that is based on at least one measurable characteristic of the incident; and an incident fatigue level that is based on a neurobehavioral state of one or more individuals associated with the incident; providing, at the computer, one or more activities, wherein each activity is parameterized by: an activity value that is based on at least one measurable characteristic of the activity; and an activity fatigue level that is based on a neurobehavioral state of an individual associated with the activity; selecting one or more activities from among the provided activities, wherein the selected activities are parameterized by activity fatigue levels within a fatigue level range of interest; selecting one or more incidents from among the provided incidents, wherein the selected incidents are parameterized by incident fatigue levels within the fatigue level range of interest; and determining a normalized contextual performance metric for the fatigue level range of interest, the normalized contextual performance metric comprising a sum of the incident values of the selected incidents divided by a sum of the activity values of the selected activities.

Aspects of the invention may be provided as a computer program product embodied in non-transitory media and comprising computer-readable instructions which when executed by a suitable computer may cause the computer to perform any of the methods disclosed herein. Specifically, another particular aspect of the invention provides a computer program product embodied in a non-transitory medium and comprising computer-readable instructions that, when executed by a suitable computer, cause the computer to perform a method for determining a normalized contextual performance metric (nCPM), the method comprising: providing, at a computer, one or more incident records, wherein each incident record represents an incident occurrence and is parameterized by: an incident value that is based on at least one measurable characteristic of the incident occurrence; and an incident fatigue level that is based on a neurobehavioral state of one or more individuals associated with the incident occurrence; providing, at the computer, one or more activity records, wherein each activity record represents an activity occurrence and is parameterized by: an activity value that is based on at least one measurable characteristic of the activity occurrence; and an activity fatigue level that is based on a neurobehavioral state of an individual associated with the activity occurrence; selecting one or more activity records from among the provided activity records, wherein the selected activity records are parameterized by activity fatigue levels within a fatigue level range of interest; selecting one or more incident records from among the provided incident records, wherein the selected incident records are parameterized by incident fatigue levels within the fatigue level range of interest; and determining a normalized contextual performance metric for the fatigue level range of interest, the normalized contextual performance metric comprising a sum of the incident values of the selected incident records divided by a sum of the activity values of the selected activity records.

Another particular aspect of the invention provides a computer program product embodied in a non-transitory medium and comprising computer-readable instructions that, when executed by a suitable computer, cause the computer to perform a method for calculating a normalized contextual performance metric, the method comprising: providing, at a computer, one or more incidents, wherein each incident is parameterized by: an incident value that is based on at least one measurable characteristic of the incident; and an incident fatigue level that is based on a neurobehavioral state of one or more individuals associated with the incident; providing, at the computer, one or more activities, wherein each activity is parameterized by: an activity value that is based on at least one measurable characteristic of the activity; and an activity fatigue level that is based on a neurobehavioral state of an individual associated with the activity; selecting one or more activities from among the provided activities, wherein the selected activities are parameterized by activity fatigue levels within a fatigue level range of interest; selecting one or more incidents from among the provided incidents, wherein the selected incidents are parameterized by incident fatigue levels within the fatigue level range of interest; and determining a normalized contextual performance metric for the fatigue level range of interest, the normalized contextual performance metric comprising a sum of the incident values of the selected incidents divided by a sum of the activity values of the selected activities.

Other aspects and features of particular embodiments will be understood from the description provided below.

BRIEF DESCRIPTION OF THE DRAWINGS

FIG. 1 is a flowchart illustrating a method for determining a normalized contextual performance metric (nCPM) according to a particular embodiment;

FIG. 6 illustrates the interrelationship among different portions of a work force for the determination of an nCPM when baseline individuals are monitored for fatigue, in accordance with a particular embodiment;

FIG. 10 is a flowchart illustrating a method for receiving fatigue timelines, which may be used with the method of FIG. 8, in accordance with a particular embodiment;

FIG. 11 is a flowchart illustrating a method for receiving sleep history data, which may be used with the method of FIG. 10, in accordance with a particular embodiment;

DETAILED DESCRIPTION

Figure 2A:
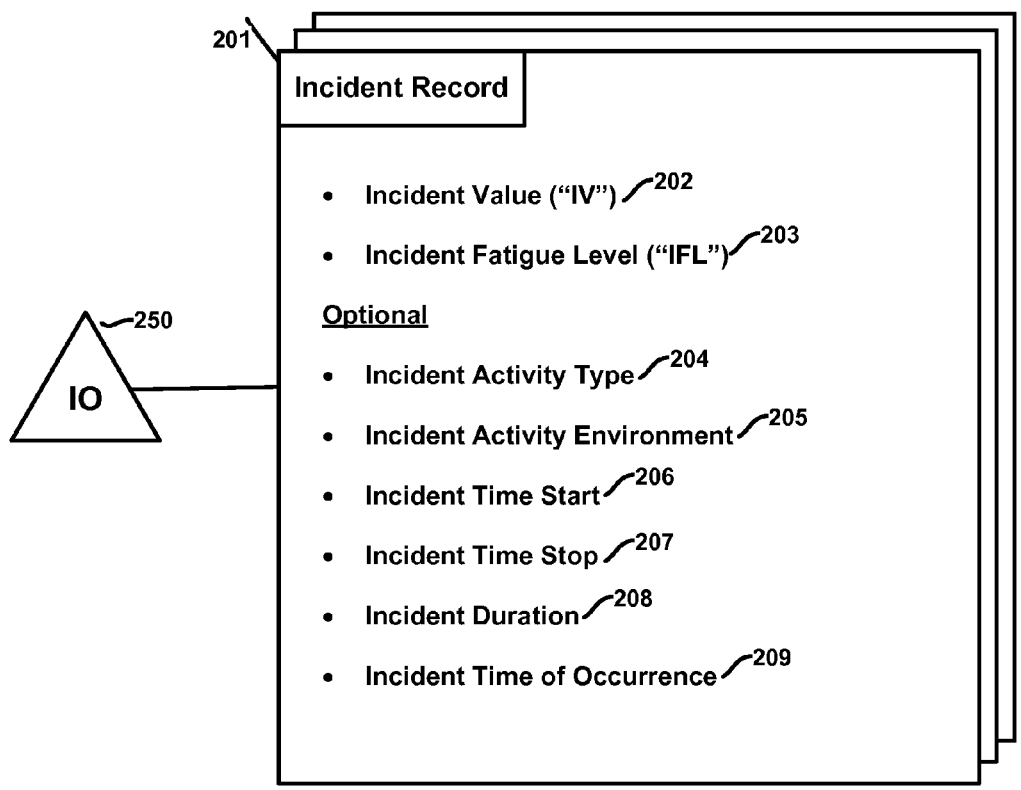
FIGS. 2A, 2B, and 2C schematically illustrate a representative set of data records and data fields used to generate an nCPM in accordance with a particular embodiment.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

As used throughout the present discussion the term "activity occurrence" refers to one or more actions, tasks, movements, motions, work assignments, work process, or other acts of physical or mental engagement and/or the like that take place in connection with a work environment or other environment where fatigue may be relevant. The activity occurrence may correspond to an individual worker's actions during the conduct of his or her job function, and may be parameterized by an activity value, an activity fatigue level, and one or more activity classifications, as these terms are discussed below.

As used throughout the present discussion the term "activity record" refers to the data representation, as used by a computer, of an activity occurrence. An activity record may comprise one or more of the following (as more fully discussed and defined below): an incident value, an incident fatigue level, an activity type, an activity environment, an activity time start, an activity time stop, an activity time duration, an individual indicator, and/or an activity time of occurrence. Additional data fields may be stored in an activity record in accordance with some embodiments of the invention.

As used throughout the present discussion the term "incident occurrence" refers to an occurrence of an event that can be characterized by at least one measureable value indicative of an enterprise's performance—including but not limited to economic performance, productivity, customer-service, managerial effectiveness, legal or administrative compliance, environmental impact, and/or the like. The incident occurrence may be associated with one or more particular individuals.

The term "incident value" is used throughout the following discussion to mean a measureable value of an incident occurrence and may refer to one or more magnitudes, values, measures, and/or other quantities associated with an incident occurrence. Non-limiting examples of incident values include dollar values of property damage, dollar values of lost productivity, administrative costs associated with incident remediation, number of injuries caused, number of injuries caused of a stated severity, lives lost, classification of an incident severity (e.g. high=3, medium=2, low=1), and/or the like. An incident value may additionally or alternatively comprise a single, unit-less number (e.g., 1), such that for a plurality of incidents, the sum of the incident values will be proportional to an incident count. Non-limiting examples of an incident occurrence and incident value include: completing assembly of products (with an incident value of 20 products successfully completed); crashing a truck (with an incident value of $10,000 in economic loss); and/or the like. An incident occurrence may also be referred to as an "historical incident."

As used throughout the present discussion the term "incident record" refers to the data representation, within a computer, of an incident occurrence. An incident record may comprise one or more of the following: incident identifier information optionally comprising a name and an incident number, a home-base location identifier, incident location information, incident date, incident time of occurrence, incident start time, incident end time, incident duration (recorded in local time in particular embodiments, not so in others), incident details including the type of work being performed at the time of incident, the work environment(s) involved in the incident, weather conditions, operational conditions or directives in effect (e.g., mandatory overtime, all-hands-on deck, etc.), a brief description of the incident occurrence, the work and sleep histories of individuals involved in (or otherwise associated with) the incident (in one embodiment, which is collected for at least 72 hours) and/or the like. In particular embodiments, the incident records are collected using a "Maintenance Incident & Accident Report Form." In other embodiments, the incident record is collected using an "Investigator's Incident Report Form."

As used throughout the present discussion the term(s) "activity value" refers to one or more magnitudes, values, measures, and/or other quantities associated with an activity occurrence. Non-limiting examples of activity values include hours worked, widgets produced, widgets produced at a stated level of quality, customers served, miles driven, inventory consumed, freight moved, and/or the like.

As used throughout the present discussion the term(s) "fatigue level range of interest" refers to a range of fatigue level values. Non-limiting examples of a fatigue level range of interest include: an upper and lower bound, a single value (upper and lower bounds are the same value), a set of discrete values (e.g. "high" and "med") and/or the like.

As used throughout the present discussion the term(s) "activity fatigue level" refers to a neurobehavioral state (such as, but not limited to, a fatigue level) associated with an individual associated with a particular activity occurrence.

As used throughout the present discussion the term(s) "incident fatigue level" refers to a neurobehavioral state (such as, but not limited to, a fatigue level) associated with one or more individuals associated with a particular incident occurrence. The incident fatigue level may (but need not) correspond to the average fatigue level of all individuals associated with an incident.

As used throughout the present discussion the term(s) "activity type" refers to a specific activity classification that identifies the type, nature, category, or other identifier associated with an activity occurrence. Non-limiting examples of activity types include clerical, managerial, manual labor, heavy lifting, specially skilled, office, field, and/or the like. As used herein an "activity type" may be associated with an activity occurrence, whether or not the activity occurrence is associated with an incident occurrence.

As used throughout the present discussion the term(s) "incident activity type" refers to an activity type associated with a particular incident occurrence. An incident activity type may (but need not) be an activity type associated with one or more individuals associated with a particular incident occurrence. As used herein, an "incident activity type" is an activity type that is associated with an activity occurrence that is specifically associated with an incident occurrence.

As used throughout the present discussion the term(s) "activity environment" refers to a specific activity classification that identifies the location, physical characteristics, setting, surroundings, or other environmental parameters that define the context and/or location in which an activity takes place. Activity environments may be broadly divided into location and non-location groupings. Non-limiting examples of activity environments defined by specific locations include factory floor, loading dock, assembly line, office, cockpit, crew cabin, and/or the like. Non-limiting examples of activity environments defined by non-location parameters include hazardous environments (i.e., where one or more threats to human safety are involved), sedentary environments (i.e., where work is performed while sitting), high-activity environments (i.e., where physical movement is required on a continuous or near continuous basis), time of day (e.g. day, night), weather (e.g. heavy rain, sun) and/or the like.

As used throughout the present discussion the term(s) "incident activity environment" refers to an activity environment associated with a particular incident occurrence. An incident activity environment may (but need not) be an activity environment associated with one or more individuals associated with a particular incident occurrence.

As used throughout the present discussion the term(s) "activity classification" refers to any grouping by which activity occurrences may be classified. Activity type and activity environment may be understood to be two specific varieties of activity classification. Non-limiting examples of additional activity classifications include: non-regularly scheduled work performance, time of day (e.g. night shift) and/or the like.

As used throughout the present discussion the term(s) "incident activity classification" refers to an activity classification associated with an incident. An incident activity classification may (but need not) be an activity classification associated with one or more individuals associated with a particular incident occurrence. As non-limiting examples these may include an incident activity type, an incident activity environment, and/or the like.

As used throughout the present discussion the term(s) "incident-related activity" refers to any activity that has been associated with an incident occurrence.

As used throughout the present discussion the term(s) "baseline individual" refers to one or more individuals from whom activity data and fatigue data is monitored on a frequent or regular basis.

As used throughout the present discussion the term(s) "incident-related individual" or "incident individual" refers to one or more individuals from whom activity data and fatigue data is monitored or collected upon the occurrence of an incident occurrence.

As used throughout the present discussion the term(s) "entire workforce" comprises the individuals associated with a work environment, including but not limited to baseline individuals, and incident-related individuals.

As used throughout the present discussion the term(s) "sleep history data" refers to data reflecting the prior sleep periods of one or more individuals. Sleep history data may (but need not) comprise sleep onset times, wake times, sleep interval durations, sleep quality, sleep disturbances, sleep location, and/or the like.

As used throughout the present discussion the term(s) "mathematical fatigue model" may refer generally to any fatigue modeling technique, as more fully discussed below.

As used throughout the present discussion the term(s) "fatigue parameter" or "fatigue parameters" may refer generally to any one or more input values accepted by a mathematical fatigue model discussed more fully below in connection with specific mathematical fatigue models. Non-limiting examples of fatigue parameters include actigraphy data, fatigue test data, sleep schedule data, work schedule data, one or more neurobehavioral trait parameters, an individual fatigue profile (or "individual profile") and/or the like. Certain fatigue parameters may be collected for an individual to create an "individual fatigue profile" as discussed more fully below.

As used throughout the present discussion the term(s) "individual fatigue profile" or "individual profile" may refer generally to any collection of data related past or present fatigue states, fatigue traits, fatigue parameters, or neurobehavioral traits of a specific individual that can be used to predict future neurobehavioral states, including fatigue states, of that individual by application of a mathematical fatigue model.

As used throughout the present discussion the term(s) "activity occurrence timeline" refers to a timeline representation of a set of one or more activity occurrences, wherein each activity occurrence may comprise an activity occurrence timeline start time, an activity occurrence timeline end time, and one or more activity periods.

As used throughout the present discussion the term(s) "fatigue timeline" refers to a timeline representation of the fatigue level of an individual and may comprise one or more fatigue periods, with each fatigue period comprising a fatigue period start time, a fatigue period end time, and a period fatigue level.

As used throughout the present discussion the term(s) "temporal intersection of the activity occurrence timeline and the fatigue timeline" or "temporal intersection" refers to the duration of time in which an activity occurrence timeline and a fatigue timeline overlap.

As used throughout the present discussion the term(s) "period fatigue level" refers to the fatigue level assigned to a portion of a fatigue timeline.

Aspects of the invention provide methods for generating a normalized contextual performance metric (nCPM) from a of incident occurrences and activity occurrences. As used throughout the present discussion the term(s) "normalized contextual performance metric (nCPM)" refers to a metric that indicates a context specific performance measurement per unit activity value, and is associated with a given fatigue level range. By way of example, an nCPM for the context of an assembly-line manufacturing environment could include the rate of defects detected per person-hour worked, associated with assembly-line employees at low fatigue level. In continuation of this example, the low fatigue level could be defined as a neurobehavioral state of an employee who averages less than one lapse during a 3-minute Psychomotor Vigilance Task. Additionally, for the same context, there may be another nCPM which corresponds to the same measurement units, but is associated with assembly-line employees at a high fatigue level, where the high fatigue level may be defined as a neurobehavioral state of an employee who averages more than four lapses on a Psychomotor Vigilance Task. Additional non-limiting examples of rates of performance measurements per unit activity values for an nCPM include: number of incidents per hours worked, number of injuries per widget produced, dollar value of accident claims per miles driven for a given fatigue level, and/or the like. In one or more particular embodiments, an nCPM may alternatively be referred to as an "incident rate," a "normalized incident rate," a "risk rate metric," an "historic risk rate metric" or "incident rate histogram."

The terms "fatigue level" and "fatigue state" are used interchangeably throughout the following discussion to refer to an overall level of fatigue of one or more individuals. It is understood that fatigue is inversely related to alertness. That is, when the fatigue level of an individual is higher, his or her alertness level is lower and vice versa. Consequently, the terms alertness level and alertness state may also be used interchangeably with fatigue level and/or fatigue state. Other types of neurobehavioral performance such as "sleepiness", "alertness", "tiredness", "cognitive performance", and/or "cognitive throughput" may be conceptually distinguished from "fatigue" in some contexts. As used herein, however, the terms "fatigue level" and "fatigue state" should be understood in the broader sense to include indicators of these types of neurobehavioral performance. Methods according to particular embodiments may be used to determine (e.g. to estimate and/or to measure) fatigue levels of an individual for the purpose of generating one or more nCPMs therefrom. For the sake of brevity, this description may refer to one or more individuals in the singular ("individual") or the plural ("individuals") and/or using one or more synonymous terms (e.g., "subject" and/or the like) interchangeably. An administrative user of the system may be referred to as a "user" or "system user." In some cases the user and individual may be one person.

Embodiments of the invention may make use of one or more techniques for measuring or testing an individual's alertness or fatigue. A variety of such fatigue/alertness measurement/testing techniques (referred to hereinafter as fatigue-measurement techniques) are known. Particular embodiments of the invention are sufficiently adaptable to utilize many (if not all) of these known fatigue-measurement techniques. Non-limiting and non-mutually exclusive examples of suitable fatigue-measurement techniques which may be used in various embodiments of the invention include testing techniques which use: (i) objective reaction-time tasks and cognitive tasks such as the Psychomotor Vigilance Task (PVT) or variations thereof (Dinges, D. F. and Powell, J. W. "Microcomputer analyses of performance on a portable, simple visual RT task during sustained operations." Behavior Research Methods, Instruments, & Computers 17(6): 652-655, 1985) and/or a so-called digit symbol substitution test; (ii) subjective alertness, sleepiness, or fatigue measures based on questionnaires or scales such as the Stanford Sleepiness Scale, the Epworth Sleepiness Scale (Jons, M. W., "A new method for measuring daytime sleepiness—the Epworth sleepiness scale." Sleep 14 (6): 54-545, 1991), and the Karolinska Sleepiness Scale (Åkerstedt, T. and Gillberg, M. "Subjective and objective sleepiness in the active individual." International Journal of Neuroscience 52: 29-37, 1990); (iii) EEG measures and sleep-onset-tests including the Karolinska drowsiness test (Åkerstedt, T. and Gillberg, M. "Subjective and objective sleepiness in the active individual." International Journal of Neuroscience 52: 29-37, 1990), Multiple Sleep Latency Test (MSLT) (Carskadon, M. W. et al., "Guidelines for the multiple sleep latency test—A standard measure of sleepiness." Sleep 9 (4): 519-524, 1986) and the Maintenance of Wakefulness Test (MWT) (Mitler, M. M., Gujavarty, K. S. and Browman, C. P., "Maintenance of Wakefulness Test: A polysomnographic technique for evaluating treatment efficacy in patients with excessive somnolence." Electroencephalography and Clinical Neurophysiology 53:658-661, 1982); (iv) physiological measures such as tests based on blood pressure and heart rate changes, and tests relying on pupillography and/or electrodermal activity (Canisius, S. and Penzel, T., "Vigilance monitoring—review and practical aspects." Biomedizinische Technik 52(1): 77-82, 2007); (v) embedded performance measures such as devices that are used to measure a driver's performance in tracking the lane marker on the road (U.S. Pat. No. 6,894,606 (Forbes et al.)); and (vi) simulators that provide a virtual environment to measure specific task proficiency such as commercial airline flight simulators (Neri, D. F., Oyung, R. L., et al., "Controlled breaks as a fatigue countermeasure on the flight deck." Aviation Space and Environmental Medicine 73(7): 654-664, 2002); and/or (vii) the like. Particular embodiments of the invention may make use of any one or more of the fatigue-measurement techniques described in the aforementioned references or various combinations and/or equivalents thereof. All of the publications referred to in this paragraph are hereby incorporated by reference herein.

Embodiments of the invention may make use of one or more techniques for modeling an individual's alertness or fatigue. A variety of such fatigue/alertness modeling techniques (referred to hereinafter as fatigue-modeling techniques) are known. Particular embodiments of the invention are sufficiently adaptable to utilize many (if not all) of these known fatigue-modeling techniques. In one particular embodiment, human fatigue is modeled using the so called "two-process model" of sleep regulation developed by Borbély (Borbély, A., Achermann, P., "Sleep Homeostatis and Models of Sleep Regulation." Journal of Biological Rhythms 14 (6): 559-568, 1999). This model posits the existence of two primary regulatory mechanisms: (i) a sleep/wake-related mechanism that builds up exponentially during the time that subject is awake and declines exponentially during the time that subject is asleep, called the "homeostatic process" or "process S"; and (ii) an oscillatory mechanism with a period of approximately 24 hours (with associated inter-individual variation and often displaying higher-order harmonic intra-individual variation as well), called the "circadian process" or "process C". Without wishing to be bound by theory, the circadian process has been demonstrated to be orchestrated by the suprachiasmatic nuclei of the hypothalamus. The neurobiology of the homeostatic process is only partially known and may involve multiple neuroanatomical structures. The reference cited in this paragraph is hereby incorporated herein by reference.

Fatigue-modeling techniques used by various embodiments of the invention are not limited to the two process model however. Any suitable fatigue-modeling technique may be used in accordance with particular embodiments. Non-limiting and non-mutually exclusive examples of such fatigue-modeling techniques can readily be found within the prior art. One such fatigue modeling technique is described in U.S. Pat. No. 6,530,884 issued to Balkin et al. on Mar. 11, 2003 for a "Method and System for Predicting Human Cognitive Performance" (the "Balkin '884 Patent" hereinafter). The Balkin '884 Patent discloses a fatigue-modeling technique that predicts cognitive performance of an individual based upon, inter alia, sleep history, and the individual's activities. The underlying mathematical model to the fatigue-modeling technique disclosed in the Balkin '884 Patent uses wake functions, sleep functions, and transition functions in combination with sleep history to gauge the cognitive performance of the individual (see Balkin '884 Patent, FIG. 2). Additional patents utilizing the Balkin '884 Patent's mathematical model include the following: U.S. Pat. No. 6,553,252 to Balkin et al. issued Apr. 22, 2003, for a "Method and System for Predicting Human Cognitive Performance;" U.S. Pat. No. 6,740,032 (also) to Balkin et al. issued May 25, 2004, for a "Method and System for Predicting Human Cognitive Performance;" and U.S. Pat. No. 6,743,167 (also) to Balkin et al., issued Jun. 1, 2004, for a "Method and System for Predicting Human Cognitive Performance Using Data from an Actigraph."

Another non-limiting example of a fatigue-modeling technique is disclosed in U.S. Pat. No. 7,192,401 issued to Sallasti et al. on Mar. 20, 2007, for a "Method for Monitoring Accumulated Body Fatigue for Determining Recovery During Exercise or Activity" (the "Sallasti Patent" hereinafter). The Sallasti Patent discloses fatigue-modeling techniques that model human fatigue during and after exercise by employing a piecewise function that accepts as multiple inputs the subject's body-fatigue index and his or her exercise intensity (see Sallasti Patent, FIG. 5). The patent documents cited in this and the preceding paragraph are hereby incorporated herein by reference.

Furthermore, there is knowledge within the prior art of methods for predicting an individual's fatigue level using one of the above-referenced fatigue-modeling techniques without recalculating the individual's predicted fatigue levels from all prior obtained state and trait variable data. It is possible using Bayesian prediction techniques to update the output of prior fatigue-modeling techniques (or, in some cases, prior fatigue-measurement techniques) using only newly added trait or state variable data. One such method, which uses Bayesian prediction methods, is described within PCT publication WO 2009/052633 (see also U.S. Published patent application Ser. No. 12/739,653), entitled "Systems and Methods for Individualized Alertness Predictions," C. Mott et al., which is hereby incorporated herein by reference.

Fatigue can be described as a functional or morphological change affecting an individual's neurobehavioral state, resulting in a diminished capacity to perform a task. Fatigue may change as a function of time of day, time, time on task, repetitions of task, age, disease state, drug consumption or concentration, posture, heart rate, ambient conditions (e.g., temperature, light levels, etc.), motivational factors, and/or the like. Fatigue may also be countered by drugs, therapies, and other interventions. Fatigue may result from the following fatigue stressors: sleep disruption; sleep restriction; circadian misalignment; sleep inertia; extended task performance or duty hours; multitasking; extended physical exertion; psychological stress (non-limiting examples include: time pressure, family legal or financial problems, and/or the like); environmental stressors (non-limiting examples include: extreme temperature or humidity conditions, ambient noise, machine vibration, light conditions, altitude "hypoxia;" medical conditions or behavioral disorders that contribute to modification of state or trait such as Parkinsons disease, Alzheimer's disease, dementia, or any age-related brain dysfunction or mild cognitive impairment, brain injuries, any cognitive brain disorder or impairment, mood disorders such depression or bipolar, etc., or psychoses such as narcissism or schizophrenia etc.) and/or the like.

This description and the accompanying claims draw a distinction between a neurobehavioral trait and a neurobehavioral state. PCT Published Pat. Application WO 2009/052,633 (the "Bayesian Patent") is hereby incorporated by reference herein. The Bayesian Patent explains the commonly used two-state model of fatigue calculations. See, e.g., paragraphs [0030] and [0031], which provide non-limiting examples of traits and states, respectively.

Generally speaking, traits are model parameters unique to an individual that tend to have relatively long-enduring values—i.e., the values do not vary greatly with time. With regard to fatigue traits in particular, non-limiting examples include: alertness on minimal sleep, night-owl vs. morning-lark status, rate of change of alertness during extended wakefulness, recovery rate of alertness, aptitude for specific performance tasks and/or the like. (See, e.g., Bayesian Patent at paragraph [0030].) States, conversely, are model parameters that are unique to individuals and that vary with circumstances or external conditions. With regard to fatigue states, in particular, non-limiting examples of neurobehavioral states include: current alertness level (or current "fatigue level"), current homeostatic process level, current circadian phase, current circadian offset, and/or the like. (See, e.g., Bayesian Patent, at paragraph [0031].)

The method for generating normalized contextual performance metrics may comprise distinguishing some model variables as persistent individual traits, and others as variable individual states. The model variables corresponding to individual traits may be considered to be relatively constant random variables, which are unique to an individual but remain substantially unchanged over time. The model variables corresponding to individual states may be considered to be random variables based on current or prior conditions (e.g. sleep or activity history, or light exposure). (See, e.g., Bayesian Patent, at paragraph [0029].)

A neurobehavioral model (and a prediction generated by a neurobehavioral model, such as a fatigue prediction from a fatigue model), may be a mathematical function dependent on one or more variables. Each of the one or more variables may be a state or a trait. Any combination of states and traits is possible (including all states, or all traits), and the variables may be combined in a mathematical function in a variety of ways (e.g. independent linear interaction, nonlinear interaction, and/or the like).

An individual profile can be generated from any of the states and traits of the foregoing discussion. The individual profile allows the unique fatigue characteristics of an individual to be captured in such a way that inter-individual differences can be expressed and utilized by the foregoing mathematical fatigue models. In addition to the states and traits of the foregoing discussion, additional fatigue parameters may be included in an individual profile. These additional fatigue parameters may include but are not limited to: Demographic Factors such as age, gender, disease state, recent behavioral history, circadian phase (or time zone), time of day when fatigue measurements were taken, current time, time on specific tasks, repetitions of task, drug and alcohol consumption, alcohol hangover, and/or the like; Individual Trait-Like Fatigue Susceptibility Factors such as sleep need (hours needed per day), sensitivity to sleep loss, sensitivity to long hours (extended wakefulness), morningness vs. eveningness (Lark and Owl), circadian amplitude effects (sensitivity to night work), sleep disorders and/or the like; Individual Countermeasure Effects sensitivity to caffeine and other stimulants, recovery benefit of nap and/or the like; Physiological Status such as heart rate, posture, HPA (Hypothalamus, Pituitary, Adrenal) axis and autonomic activation, drug concentration, hypoxia, injury, illness or flu and/or the like; Psychological Factors such as morale, motivation, stress levels (time pressure, etc.) and/or the like; Environmental Factors such as ambient conditions (e.g., temperature, light levels, noise levels etc.), hazardous conditions or fumes (heat, vibration, noxious gas, engine exhaust, $CO_2$ levels etc.), hypoxic environment (e.g., aircraft cabin is 0.75 ATM cabin pressure), and/or the like; Planned Future Activities such as time of work shift, timing of critical tasks, time since last break, time until next break, and/or the like; Other Contextual Factors such as financial incentives (e.g., long-distance truck drivers not stopping to rest because they are incented to keep driving), criminal and civil liabilities for conducting operations at a particular fatigue level, disruption to productivity, emotional consequence of outcome (e.g., doctor operating on patient), past history of mistakes and citations, certain legal standards (HOS of service, DOT CSA standards), and company or other institutional policies, and/or the like.

Given one or more of the foregoing fatigue parameters, an individual profile can be created to accomplish one or more of the following non-limiting objectives: i) predict future fatigue levels when the profile is provided to one or more of the foregoing mathematical fatigue models; ii) reduce fatigue levels generally or at specific key intervals (when an important or safety sensitive task will be performed) by using individualized fatigue countermeasures that are optimally timed and correctly dosed; iii) reduce the risk that fatigue will result in a critical task error by providing education about task scheduling (e.g., education material may advise to avoid safety-sensitive tasks during periods when fatigue is predicted to be highest; iv) Reduce the risk of fatigue related task error by changing the task operating procedures (e.g., when an individual is fatigue they will usually be able to compensate by slowing down the tempo of the task to maintain requisite accuracy; iv) reduce the risk of error by knowing a co-worker's or team members' fatigue-risk level so that the individual can provide additional support to compensate (e.g., a manager using the profile to schedule additional coffee breaks, to bring in additional workplace resources, or to reassign tasks to less fatigued individuals).

FIG. 1 is a flowchart illustrating a method 100 for generating one or more normalized contextual performance metrics (nCPMs) according to a particular embodiment. Method 100 may be practiced in connection with a work environment (not shown) or any other environment where fatigue may be relevant. Method 100 may be administered by an administrative user (not shown), such as a supervisor responsible for managerial decision-making in connection with the work environment. Such an administrative user may be referred to herein as a "user" of the method 100 and the various embodiments of the disclosed invention. Method 100 may be run on any suitable computer or computer system, such as the non-limiting example computer system shown in FIG. 13.

Method 100 begins with parallel steps 101 and 102 wherein incident records and activity records, respectively, are received other otherwise provided. Incident records and activity records are the data representation, within a computer, of incident occurrences and activity occurrences, respectively. Exemplary data records that may be used in a computer by a particular embodiment for representing activity occurrences and incident occurrences in connection with method 100 are provided below in connection with FIG. 2.

Non-limiting examples of incident occurrences represented by the incident records received in step 101 may include events that are related to an economic loss, physical accident, human injury, reduced productivity in workplace tasks, decreased quality of products or services, and/or the like. Non-limiting examples of activity occurrences represented by the activity records received in step 102 include specific work assignments of one or more individuals, work task information, work location information, details of the physical demands made by the task assignment (e.g., lifting, sitting, standing, and/or the like), environmental factors affecting the work performance (e.g., noise, heat, vibration, presence of physical dangers, and/or the like), and/or the like. In particular embodiments, step 102 (receive activity records) is preceded by optional step 125, wherein temporal intersections are found as between received activity timelines and received fatigue timelines in accordance with method 800 of FIG. 8 and as more fully discussed in connection therewith. The output of step 125 are activity records that can be received by step 102 of method 100.

Method 100 proceeds with parallel steps 103 and 104 wherein the step 101 incident records and the step 102 activity records of step 102 are selected in accordance with one or more selection parameters 110, respectively. Selection parameters 110 may include a fatigue level range of interest 110a and one or more optional activity classifications 110b, 110c. Fatigue level range of interest 110a represents the fatigue level range at which the nCPM will be determined. Fatigue level range of interest 110a may be provided by the user, retrieved from a database, received from a computer, and/or the like. Fatigue level range of interest 110a may comprise a single fatigue value (e.g., a discrete value from within a set of discrete or continuous fatigue level values) or a range of fatigue values. Optional activity classifications 110b, 110c represent additional filtering criteria for the selection steps 103, 104. These include but are not limited to activity type, activity environment, and any other classification upon which one set of activity occurrences may be distinguished from another.

Method 100 then proceeds to step 105 wherein the nCPM may be determined by: i) summing all incident values associated with the incident records selected in step 103, ii) summing all activity values associated with the activity records selected in step 104, and iii) dividing the sum of incident values by the sum of activity values.

Non-limiting examples of normalized contextual performance metrics determined in step 105 include: the number of incidents per hours worked for a given fatigue level, the number of workplace injuries per widgets produced for a given fatigue level, and/or the like.

Method 100 may then proceed with optional step 120 in which a scaling factor is used to modify the nCPM. Constant monitoring of the activity and fatigue states of all individuals in a workplace may not always be possible. In such cases the nCPM may not convey the desired information. Scaling factors 640 (an incident-to-baseline ratio) and 650 (a workforce-to-baseline ratio), discussed in connection with FIG. 6 (below), may be used in optional step 120 to multiply the step 105 nCPM value when such modifications are desirable. Additional time-based scaling factors 660 (an incident-to-baseline temporal ratio) and 670 (a workforce-to-baseline temporal ratio) may be used in optional step 120 and are also discussed in connection with FIG. 6 (below).

Figure 2D:
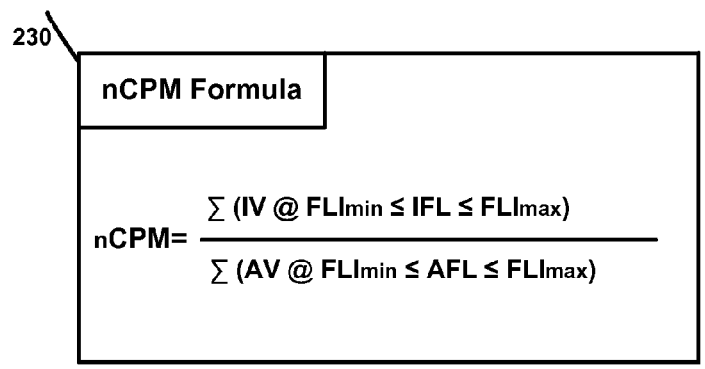
FIG. 2D schematically illustrates a formula for determining an nCPM in accordance with a particular embodiment.
Figure 2B:
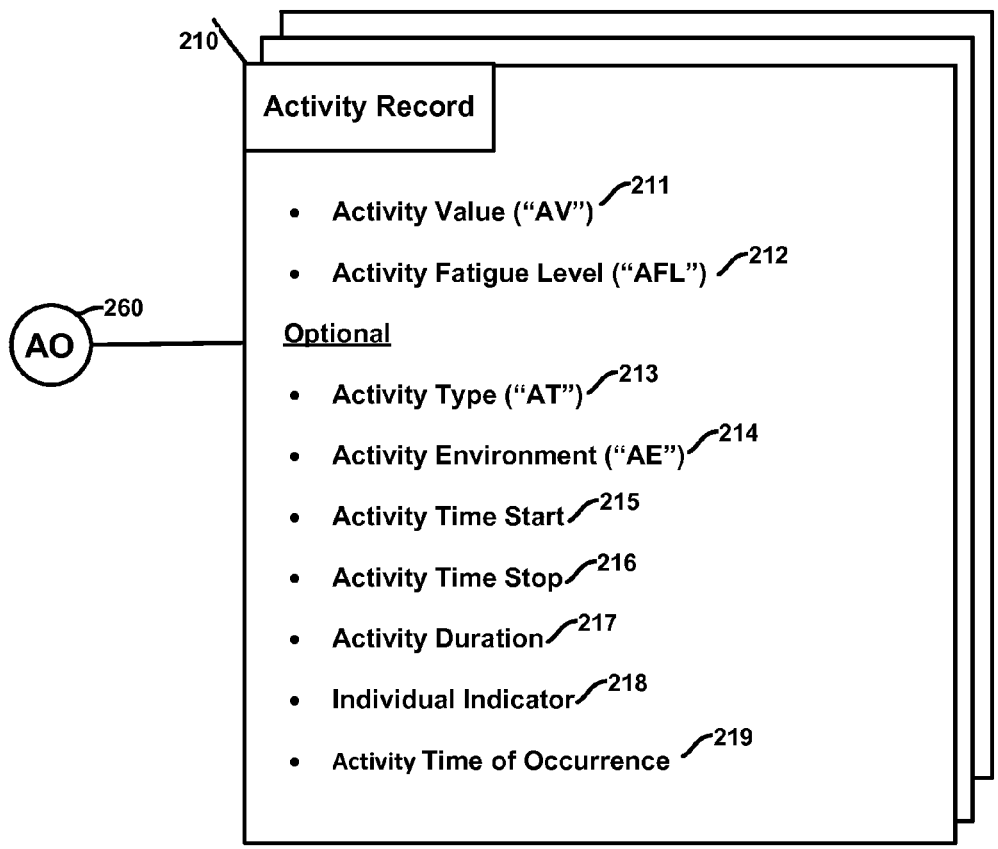

FIGS. 2A and 2B illustrate an example set of data records as might be used by method 100 in a particular embodiment. FIG. 2A shows an example incident record 201, which may be received in step 101 of method 100. Incident record 201 represents an incident occurrence 250 and comprises: an incident value ("IV") 202 and an incident fatigue level ("IFL") 203. Incident value 202 represents one or more magnitudes, values, measures, or other quantities associated with incident occurrence 250. Incident fatigue level 203 represents a fatigue level associated with incident occurrence 250. Incident fatigue level 203 may (but need not) be a fatigue level associated with one or more individuals associated with incident occurrence 250. Incident records 201 may comprise one or more optional data fields, such as: an incident activity type 204, and an incident activity environment 205, and one or more additional or alternative incident classifications. An incident activity type 204 represents a specific incident classification that identifies the type, nature, category, or basic identifier associated with incident occurrence 250. Incident activity environment 205 refers to a specific incident classification that identifies the location, physical characteristics, setting, surroundings, or other environmental parameters that define the location in which incident occurrence 250 takes place. Incident record 201 may also include optional fields for incident time start 206, incident time stop 207, incident duration 208, and time of occurrence 209. (Time of occurrence 209 refers to the time incident occurrence 250 took place.)

FIG. 2B shows an exemplary activity record 210, which may be received in step 102 of method 100. Activity record 210 represents an activity occurrence 260 and comprises: an activity value ("AV") 211 and an activity fatigue level ("AFL") 212. Activity value 211 represents one of several possible magnitudes, values, measures, or other quantities associated with activity occurrence 260. Activity fatigue level 212 represents the fatigue level of an individual associated with activity occurrence 260. Activity records 210 may also comprise one or more optional data fields, such as: an activity type ("AT") 213, an activity environment ("AE") 214, and one or more additional or alternative activity classifications. Activity type 213 represents a specific activity classification that identifies the type, nature, category, or basic identifier associated with activity occurrence 260. Activity environment 214 is a specific activity classification that identifies the location, physical characteristics, setting, surroundings, or other characteristic that define the location or environment in which activity occurrence 260 takes place. Activity record 210 may also include optional fields for activity time start 215, activity time stop 216, activity duration 217, and activity time of occurrence 219. An individual indicator field 218 is also optionally provided for the purpose of associating a particular individual (by an indicator such as name, employee number, etc.) to the activity occurrence 260 represented by activity record 210.

Figure 2C:
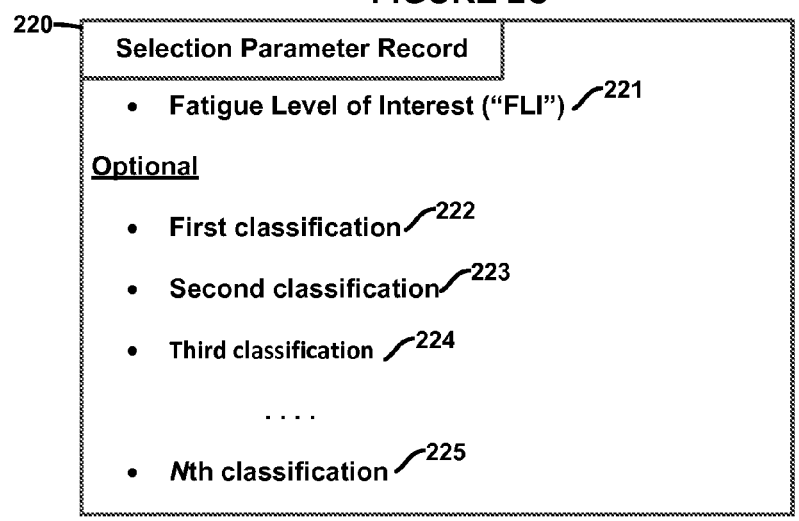

FIG. 2C schematically illustrates an example selection parameter record 220, which may be used in selection steps 103, 104 of method 100. Selection parameter record 220 comprises a fatigue level range of interest 221. Fatigue level range of interest 221 may provide the value for the fatigue level range of interest 110a of the block 110 selection parameters (see FIG. 1). Selection parameter record 220 may also comprise one or more optional data fields, including: a first activity classification 222, a second activity classification 223, and additional activity classifications (not shown). First and/or second activity classification 222, 223 may comprise an activity type and/or an activity environment, in particular embodiments in which selection parameter 110, 220 is used in steps 103 and 104 of method 100 to select incident records and activity records according to incident activity type 204 and incident activity environment 205 of incident record 201, and activity type 213 and activity environment 214 of activity record 210, respectively. In accordance with alternative embodiments, any of the third classification 224 through the Nth classification 225 of selection parameter record 220 may refer to one or more of any of the optional fields 206, 207, 208, 209 of incident record 201 and the corresponding optional fields 215, 216, 217, 219 of activity record 210. In this fashion selection steps 103, 104 of method 100 may take into account an arbitrarily large number of selection parameters corresponding to optional data fields parameterizing incident occurrence 250 and activity occurrence 260.

FIG. 2D schematically illustrates an nCPM formula 230, which may be used in step 105 of method 100 to determine an nCPM. nCPM formula 230 illustrates the sum of incident values at a fatigue level range of interest divided by the sum of activity values at the same fatigue level range of interest.

Figure 3:
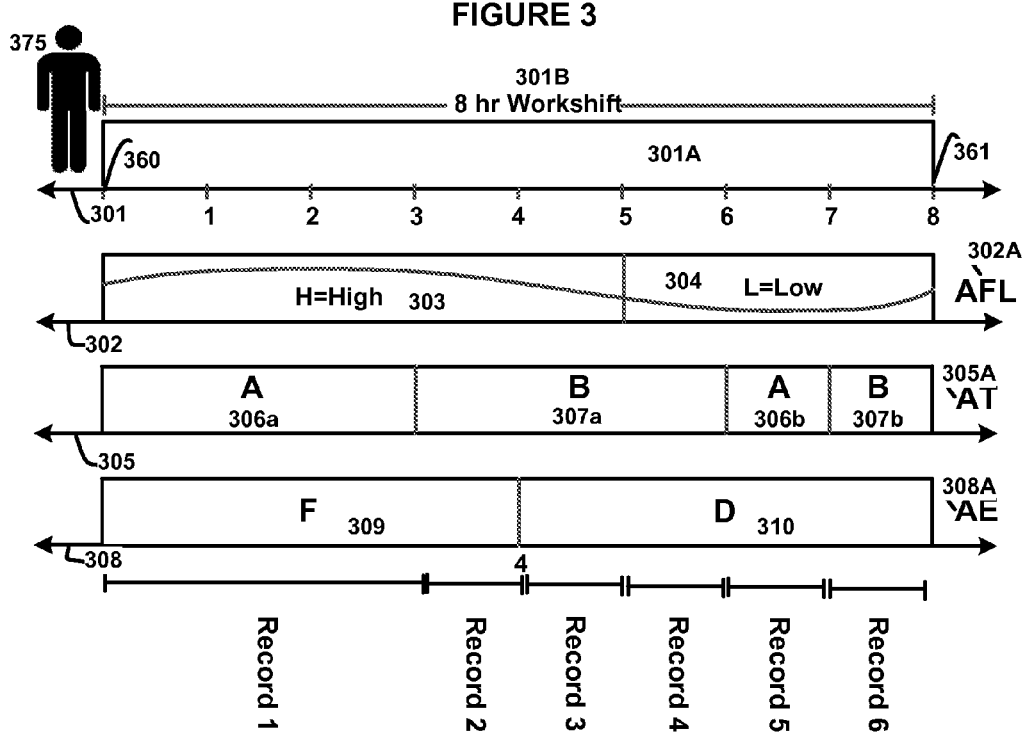
FIG. 3 is a set of graphs illustrating the relationship between activity records and a sample work shift of an individual, in accordance with a particular embodiment.

FIG. 3 provides a diagram illustrating the parsing of a work shift—which can be conceived as a collection of activity occurrences—into a collection of activity records, in accordance with a particular embodiment. In the FIG. 3 example, hypothetical work shift 301B representing a standard eight hour workday for typical worker 375 is represented by an activity period 301A with activity period start time 360 and an activity period end time 361, representing the beginning and end of the workshift 301B respectively. Activity period 301A of the illustrated embodiment is parameterized by the following non-limiting characteristics: activity fatigue level (AFL) 302A, activity type (AT) 305A, and activity environment (AE) 308A. Values relating to these characteristics 302A, 305A, 308A will become parameters for the activity occurrences parsed from activity period 301A and become values for the data fields of activity records 351-356 representing those activity occurrences.

As illustrated in FIG. 3, activity fatigue level 302A comprises two values during work shift 301B: an activity fatigue level value of H for "High Fatigue Level" and an activity fatigue level value of L for "Low Fatigue Level." Alternative embodiments may include continuous, discrete, or multivalued activity fatigue-level values and/or the like. As illustrated in FIG. 3, worker 375 experiences a high fatigue level H for the time subperiod 303 (i.e. the first five hours of work shift 301B) and experiences a low fatigue level L for the time subperiod 304 (i.e. the final three hours of work shift 301B). Time periods 303 and 304 collectively comprise fatigue period timeline 302.

Activity time period 301A representing hypothetical work shift 301B is also characterized by an activity type 305A which includes alternating time subperiods 306a, 306b of activity type A (e.g., sitting) and time subperiods 307a, 307b of activity type B (e.g., standing). As illustrated, worker 375 has engaged in activity type A for the time periods comprising the first time subperiod 306a (of three-hours duration), and the third time subperiod 306b (of one hour duration) of activity time period 301A and has engaged in activity type B for the time periods comprising the second time subperiod 307a (of three-hours duration) and the fourth time subperiod 307b (of one hour duration) of activity time period 301A as illustrated on the activity-type timeline 305.

Figure 8:
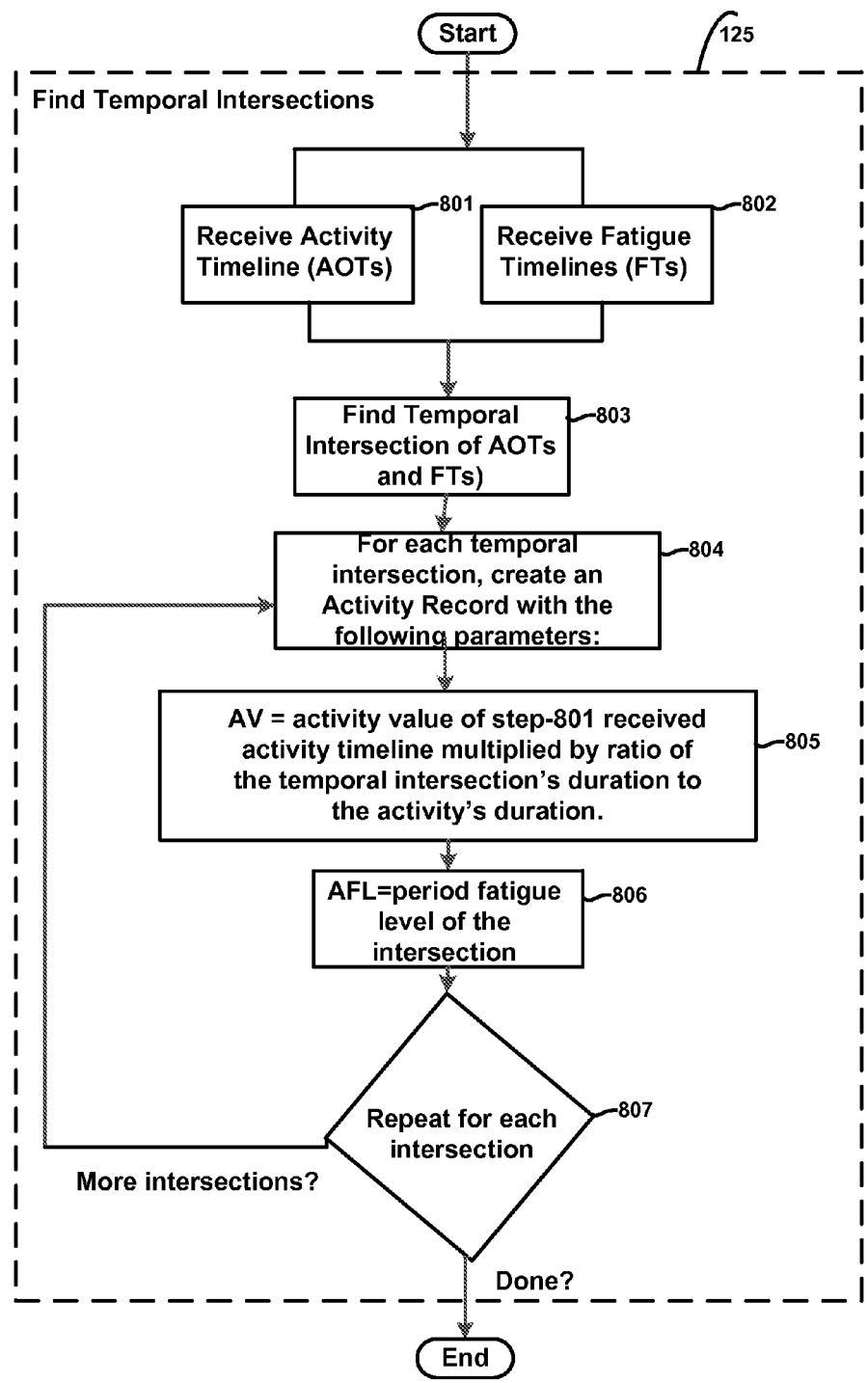
FIG. 8 is a flowchart illustrating a method for generating activity records from the temporal intersection of an activity occurrence timeline and a fatigue timeline, in accordance with a particular embodiment.

Activity time period 301A representing hypothetical work shift 301B is also characterized by an activity environment parameter 308A, which, in the illustrated embodiment, includes activity environment types F (e.g., floor) and D (e.g., dock) (without limitation). As illustrated, worker 375 worked in activity environment F for the time subperiod 309 comprising the first four hours of activity period 301A and worked in activity environment D for the time subperiod 310 comprising the second four hours of activity period 301A as illustrated on the activity-environment timeline As described above, activity timeline 301 may now be parsed into a collection of activity records. Parsing the specific activity records that comprise activity timeline 301 may be accomplished by finding the temporal intersections of activity timeline 301, fatigue timeline 302, activity-type timeline 305, and activity-environment timeline 308 that have particular values (e.g., continuous single values) for each corresponding characteristic 302A, 305A, 308A. In embodiments where additional activity classifications are used, the parsing of activity records from activity timeline 301 may also involve finding temporal intersections with the time periods where such additional activity classifications have particular values (e.g., continuous single values). Whenever the value of any of these characteristics 302A, 305A, 308A change, a new activity record is created. FIG. 8 provides a flowchart for a method 800 to create activity records from the temporal intersection of activity occurrence timelines and fatigue timelines.

By way of non-limiting example, the scenario of FIG. 3 displays six (6) activity records 351 to 356. Together, activity records 351-356 represent the entirety of work shift 301B. Activity record 351 corresponds to the first three-hour period of hypothetical work shift 301B, a duration in which the temporal intersection of the activity timeline 301A and the fatigue timeline 302A are each of constant value. Activity record 351 corresponds to the first three hour period of work shift 301B, a period which represents the temporal intersection of activity timeline 301A with: the fatigue time subperiod 303, where activity fatigue level 302A has a continuous single value of H; the activity-type time subperiod 306a, where activity type 305A has a continuous single value of A; and the activity-environment time subperiod 309 where activity environment 308A has a continuous single value of F. Similar activity records 352-356 may be constructed for the remaining one-hour periods of hypothetical work shift 301B as shown in FIG. 3.

Figure 4:
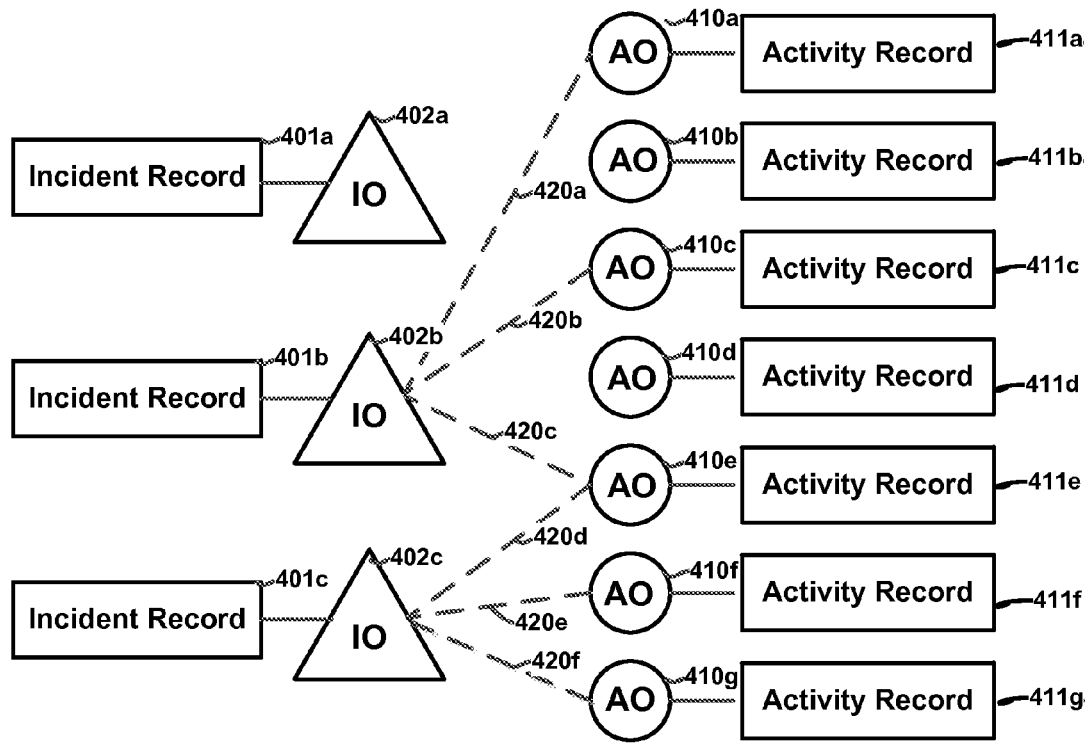
FIG. 4 illustrates an association of activity occurrences with incident occurrences and provides examples of incident-related activity records and incident records, in accordance with a particular embodiment.

FIG. 4 graphically illustrates the relationships between incident records, incident occurrences, activity records, and activity occurrences, in accordance with a particular embodiment. Specifically, incident occurrences 402 are represented by incident records 401, and activity occurrences 410 are represented by activity records 411. Although it is not necessary for all embodiments, in particular embodiments an activity occurrence 410 may be associated with an incident occurrence 402. Non-limiting examples of conditions or circumstances where an association may be created between an incident occurrence 402 and an activity occurrence 410 include: i) ascertaining the activity occurrence 410 to be causally connected with the incident occurrence 402; ii) identifying one or more individuals associated with the incident occurrence 402 and identifying one or more relevant activity occurrences 410 for the individuals; iii) identifying a time of occurrence for the incident occurrence 402 and identifying one or more activity occurrences 410 that were taking place in a time window before, during or after the time of occurrence for the incident occurrence 402; iv) identifying a particular activity environment in which the incident occurrence 402 happened (e.g., a particular factory, a specific hanger, or on the docks) and collecting all activity records for activity occurrences related to the particular activity environment; v) conducting an incident-specific investigation into the incident occurrence and associating activity occurrences in accordance with the investigation; vi) by random sampling of activity occurrences 402; vii) using any combination of the foregoing i) through vi); and/or the like.

There need not be a one-to-one correspondence between incident occurrences 402 and activity occurrences 410. FIG.

4 schematically illustrates an association between incident occurrence 402b and activity occurrences 410a, 410c, 410e using dashed lines 420a, 420b, 420c. Similarly, FIG. 4 schematically illustrates an association between incident occurrence 402c and activity occurrences 410e, 410f, 410g using dashed lines 420d, 420e, 420f. It will be appreciated that in the FIG. 4 example, incident occurrences 402b, 402c are each associated with multiple activity occurrences 410. Similarly, in the FIG. 4 example, activity occurrence 410e is associated with multiple incident occurrences 402. Not all incident occurrences 402 need to be associated with activity occurrences 410 (e.g., incident occurrence 402a). Similarly not all activity occurrences 410 need to be associated with incident occurrences (e.g., activity occurrences 410b and 410d are not associated with an incident occurrence 402). Associations between incident occurrence(s) 402 and activity occurrence(s) 410 may be reflected (e.g., using suitable fields (not shown)) in their corresponding incident records 401 and activity records 411.

Figure 5:
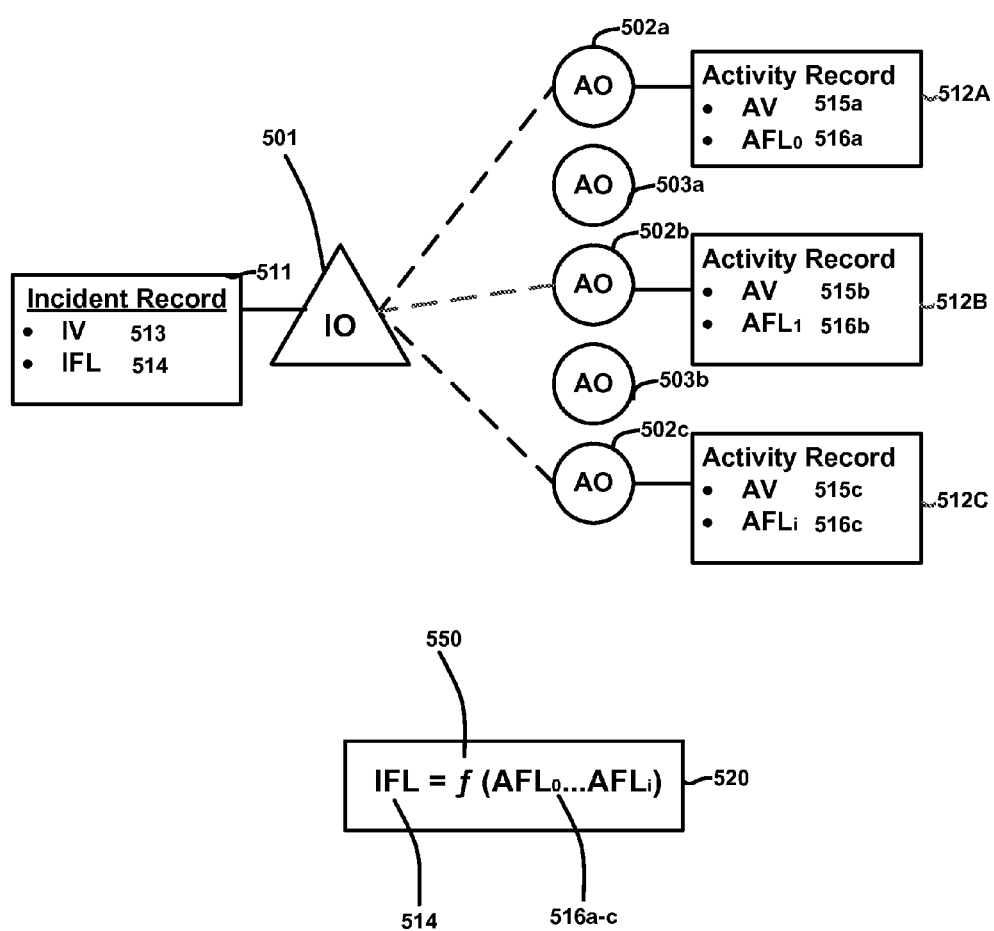
FIG. 5 illustrates an example determination of an incident fatigue level as a generic function of the activity fatigue levels of one or more incident-related activity occurrences, in accordance with a particular embodiment.

In many embodiments, there is no connection between the activity fatigue levels of activity records and incident fatigue levels of incident records. However, in some embodiments (e.g. where incident occurrences and activity occurrences—and their corresponding incident records and activity records—are associated with one another), it is possible that the incident fatigue level of an activity-related incident record may be ascertained from the activity fatigue levels of the associated activity record(s). FIG. 5 shows an activity-related incident record 511. Incident record 511 is referred to as "activity-related" because the incident occurrence 501 represented by incident record 511 is associated with one or more activity occurrences 502a, 502b, 502c. Conversely activity records 512a, 512b, 512c may be referred to as "incident-related" activity records 512a, 512b, 512c because the activity occurrences 502a, 502b, 502c represented by activity records 512a, 512b, 512c are associated with an incident occurrence 501.

In particular embodiments, a suitable function may be used to determine the incident fatigue levels of activity-related incident records (e.g. activity-related incident record 511 of FIG. 5) on the basis of the activity fatigue levels of the associated incident-related activity records (e.g. incident-related activity records 512B, 512B, 512C of FIG. 5). Taking the illustrated example of FIG. 5, some embodiments involve using a suitable function to determine the incident fatigue level 514 of activity-related incident record 511 based on the activity fatigue levels 516a, 516b, 516c of incident-related activity records 512a, 512b, 512c.

Equation 520 illustrates a function, $f$ 550, operating on the set of activity fatigue levels $AFL_0 \ldots AFL_i$ (e.g. activity fatigue levels 516a, 516b, 516c of incident-related activity records 512A, 512B, 512C) to provide an incident fatigue level IFL value (e.g. a value for incident fatigue level 514 of activity-related incident record 511). Function 550 may be constructed based upon unique factors specific to a particular work environment, characteristics unique to particular incident occurrences or activity occurrences, and/or the like. In one embodiment function 550 comprises an average of activity fatigue levels $AFL_0 \ldots AFL_i$. In another embodiment function 550 comprises a weighted average of activity fatigue levels $AFL_0 \ldots AFL_i$, where activity values $AV_0 \ldots AV_i$ (e.g. activity values 515a, 515b, 515c of incident-related activity records 512a, 512b, 512c) are used as the corresponding weights. Function 550 may take additional or alternative functional forms.

Referring back to FIG. 1, method 100 describes a particular embodiment suitable for situations in which an entire workforce, or an evenly distributed sample of the workforce, is monitored for fatigue, activity occurrences, and incident occurrences. Non-limiting examples of monitoring for fatigue may include requiring individuals to do one or more of the following: filling out sleep questionnaires, keeping sleep diaries, adhering to strict sleep schedules, undergoing observed sleep (e.g., a camera or human observer), wearing activity sensors, taking fatigue tests upon reporting to work, and/or the like. Non-limiting examples of monitoring for activity occurrences may include one or more of the following: strict application of assigned work or activity roles (e.g., no switching shifts with coworkers), time cards, work place or other environmental surveillance (e.g., cameras, human managers, etc.), and/or the like. Non-limiting examples of monitoring for incident occurrences may include one or more of the following: work place or other environment surveillance, quality control procedures applied to the goods or services produced, industrial measurement techniques (e.g., efficiency studies, etc.), and/or the like. Collectively, monitoring for fatigue, activity occurrences, and incident occurrences will be referred to herein as "monitoring." Monitoring the entire workforce, however, may involve a considerable investment of time and resources and therefore may not be suitable for all environments.

In some embodiments, a subset of the workforce may be monitored, where the subset may or may not represent an evenly distributed sample of the workforce. When subsets are monitored (instead of the entire workforce), particular embodiments may involve determining the nCPM using additional information reflecting the subset of monitored individuals. In some embodiments, the information may be used to generate a scaling factor which may be applied in (optional) block 120 of method 100.

FIG. 6 uses Venn diagrams to illustrate the possible relationships between baseline individuals (BL), incident-related individuals (I), and the entire workforce (WF). FIG. 6 also provides two ratios that may be used as scaling factor(s) in optional step 120 of method 100 to modify nCPMs when workforce size or other factor(s) prohibits monitoring its entirety. Subsets representative of the workforce can be monitored for fatigue, activity occurrences, and incident occurrences (according to the foregoing techniques). A subset of baseline individuals (BL) includes individuals in the workforce who are monitored over a period of time. A subset of incident-related individuals (I) includes individuals within the workforce for whom incident occurrence data (e.g., incident records 201; FIG. 2A) and activity occurrence data including fatigue data (e.g., activity records 210 including activity fatigue level 212; FIG. 2B) are recorded upon the happening of an incident occurrence, over a period of time. In particular embodiments, individuals may be designated as part of an incident-related group or baseline group at the beginning of a fatigue study. Individuals who are neither baseline (BL) nor incident-related (I) may be referred to as "work force" individuals. The entire workforce (WF) may comprise any combination of baseline individuals (BL), incident-related individuals (I), and "work force" individuals.

Venn diagram 601 illustrates the case where the set of baseline individuals 604 is distinct from the set of incident-related individuals 603, both of which are subsets of the entire workforce 602. Venn diagram 610 illustrates the case where the set of baseline individuals 613 intersects the set of incident-related individuals 612, both of which are subsets of the entire workforce 611. Venn diagram 620 illustrates the case where the set of baseline individuals 622 is coincident with the set of incident-related individuals 623, both of which are subsets of the entire workforce 621. Venn diagram 630 illustrates the case where the set of baseline individuals 631 is coincident with the set of incident-related individuals 632, both of which are coincident with entire workforce 633.

Representing the number of individuals within the entire workforce as $N_{WF}$, the number of baseline individuals as $N_{BL}$, and the number of incident-related individuals as $N_I$, several ratios can be determined. Such ratios may be used as scaling factors in optional step 120 of method 100. By way of non-limiting example, FIG. 6 illustrates a baseline-to-incident ratio $N_{BL}/N_I$ 640, which may be used as a scaling factor in optional step 120 of method 100. Other scaling factors may be used in optional step 120 of method 100.

For those situations in which monitoring all individuals in the workforce is not practicable (e.g. Venn diagrams 601, 602, and 603), a scaling factor may be used in block 120 to modify the step-105 nCPM of method 100. In such cases, the outcome of step 120 may be referred to as a "scaled normalized contextual performance metric."

In some circumstances, fatigue and activity monitoring may not be conducted for all individuals (whether workforce, baseline or incident-related) for all times. In such circumstances, it may be desirable to use a step-120 scaling factor proportional to the time for which such monitoring is conducted on the respective groups of individuals. If $T_{BL}$ is used to represent the duration of the monitoring period for baseline individuals (BL), $T_I$ duration of the monitoring period for incident-related individuals (I), and $T_{WF}$ the duration of the monitoring period for the entire workforce (WF), then an additional scaling factor can be defined. The baseline-to-incident temporal ratio 660 is defined as $T_{BL}/T_I$ and may also be used as a step-120 scaling factor.

Figure 7:
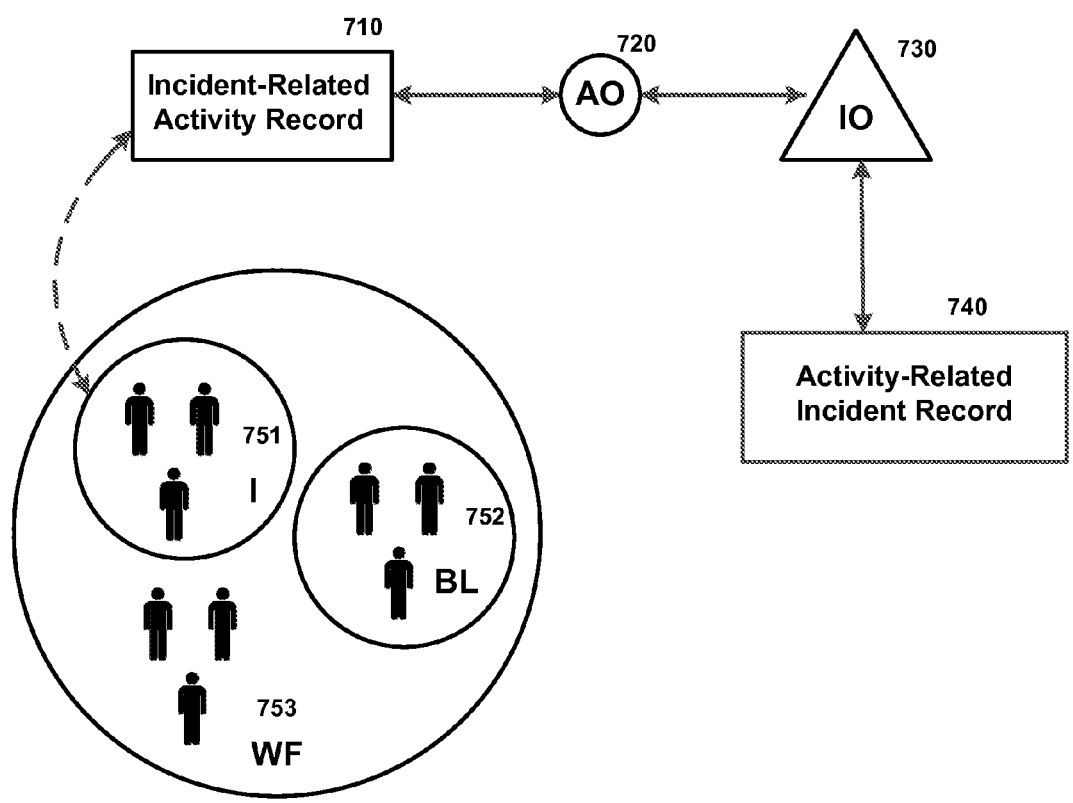
FIG. 7 illustrates a connection between incident-related individuals and an incident occurrence, in accordance with a particular embodiment.

FIG. 7 re-introduces the use of an incident-related activity record 710 and illustrates its connection to a set of incident-related individuals 751. As explained above, workforce 750 of the FIG. 7 example comprises baseline individuals 752, incident-related individuals 751, and workforce individuals 753. When an incident occurs (i.e., incident occurrence 730), activity-related incident record 740 is created. In a particular embodiment, one or more activity occurrences 720 may be identified as being associated with the incident occurrence 730 at this time (i.e., when activity-related incident record 740 is created upon the happening of incident occurrence 730). In an alternative embodiment, incident-related individuals 751 will have been identified prior to incident occurrence 730 and then subsequently monitored. Incident-related activity record 710 may thereby be created using the fatigue and activity data collected from incident-related individuals 751, and incident-related activity record 710 may thereby be associated with activity-related incident record 740.

FIG. 8 is a flowchart illustrating method 800 for receiving activity records from the temporal intersection of activity occurrence timelines and fatigue timelines, as schematically illustrated in FIG. 3. Method 800 may take place as an optional precursor step to step 102 (receive activity records) of method 100 (FIG. 1). Method 800 begins with the steps of receiving or otherwise providing activity occurrence timelines (AOTs), step 801, and receiving or otherwise providing fatigue timelines (FTs), step 802. An activity occurrence timeline may comprise a representation of a time period during which an activity occurrence took place. The time period may be defined by: a start time and an end time, or alternatively a duration. A time start or end time may be defined in absolute calendar time (e.g. UTC format), or as a time offset relative to a baseline time.

Figure 9:
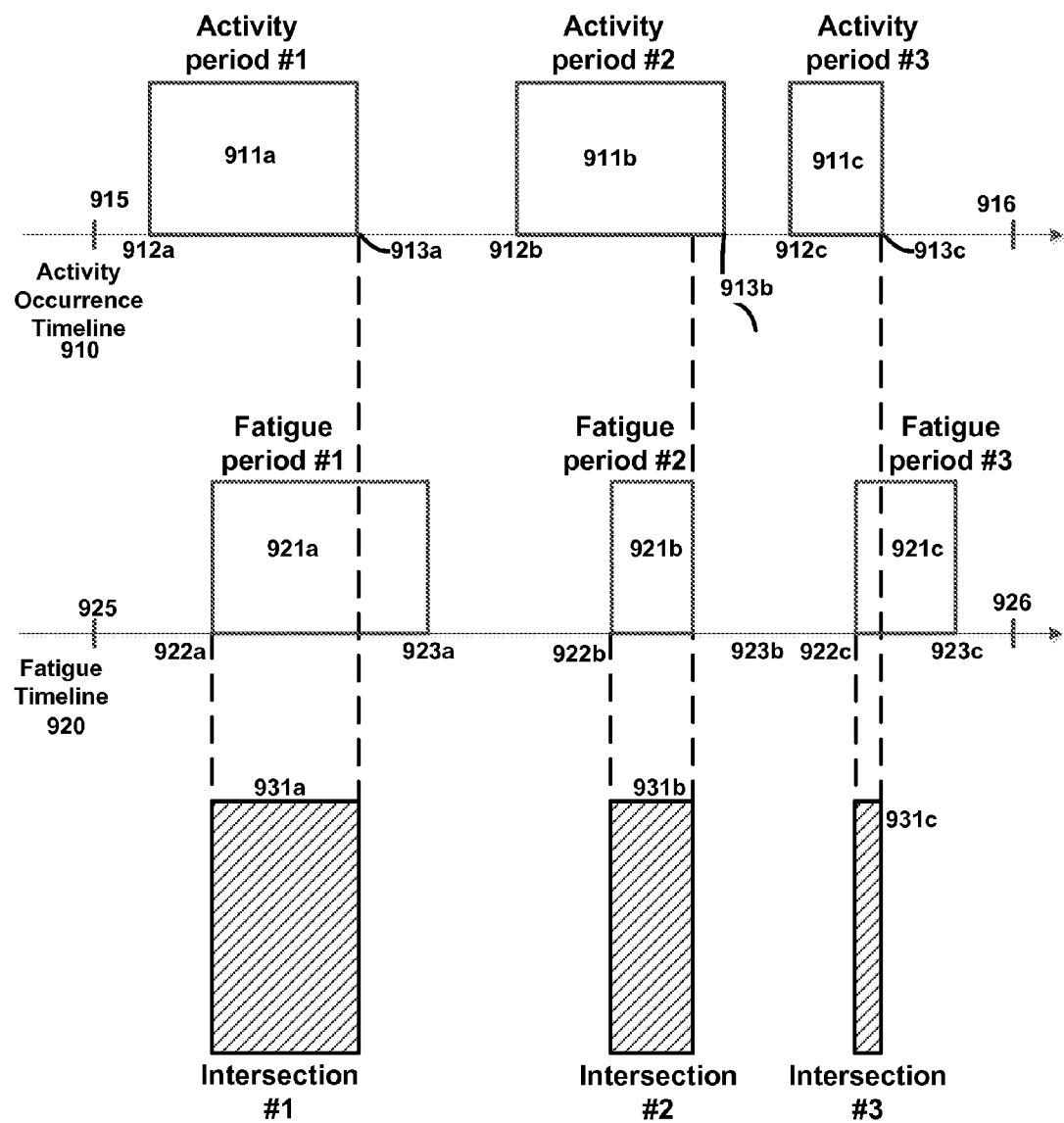
FIG. 9 provides a timeline that illustrates the temporal intersection of an activity occurrence timeline and a fatigue timeline, in accordance with a particular embodiment.

FIG. 9 illustrates an exemplary activity occurrence timeline 910. Activity occurrence timeline has an activity occurrence timeline start time 915 and an activity occurrence timeline end time 916. (Activity period timeline 901 is analogous to the work shift 310 of FIG. 3.)

Activity periods of interest may comprise sub-portions of activity occurrence timeline 910. For example, activity occurrence timeline 901 is divided into three distinct activity periods 911a, 911b, and 911c. Activity period 911a has activity period start time 912a and activity period end time 913a. Similarly, activity period 911b has activity period start time 912b and activity period end time 913b. Work shift 301 (FIG. 3) is divided into eight (8) one-hour time periods for purposes of parsing activity records 210 therefrom.

Similarly, a fatigue timeline is a timeline representation of a fatigue level in an individual, work force, or work environment and may comprise a start time, an end time, a duration, and a period fatigue level. FIG. 9 illustrates a fatigue timeline 920 with a fatigue timeline start time 925 and a fatigue timeline end time 926. Fatigue timeline 920 also comprises three fatigue periods 921a, 921b, and 921c, each with fatigue start times 912a, 912b, 912c and fatigue end times 913a, 913b, 913c, respectively. A period fatigue level represents the fatigue level of the individual during the fatigue period. Fatigue level period 302 from workshift 310 of FIG. 3 is analogous to fatigue timeline 910, inasmuch as the eight-hour works shift 301 is broken into two separate fatigue periods, fatigue period 303 with period fatigue level H(igh) and fatigue period 304 with period fatigue level L(ow).

Returning to FIG. 8, method 800 continues with step 803, which involves ascertaining one or more temporal intersections of step-801 received activity occurrence timeline (OT) and the step-802 received fatigue timeline (FT). This is accomplished by identifying the activity periods within the activity timeline, identifying the fatigue periods within the fatigue timeline, and then identifying any intersections of the activity periods and the fatigue periods. As illustrated in the example case of FIG. 9, the temporal intersection of activity occurrence timeline 910 and fatigue timeline 920 comprises a set of times 931a, 931b, 931c during which an activity period 911a, 911b, 911c overlaps with a fatigue period 921a, 921b, 921c, respectively.

For each step-803 temporal intersection, method 800 continues in step 804 by creating a corresponding activity record. One or more parameters may be assigned to the step-804 activity records in blocks 805, 806. In the illustrated embodiment, step 805 assigns an activity value to the newly created block-804 activity record. The block-805 assigned activity value may be based on an activity value associated with the activity occurrence represented by the step-801 received activity timeline. In some embodiments, the step-805 assigned activity value may comprise an activity value associated with the activity occurrence represented by the step-801 activity timeline multiplied by a factor comprising a ratio of the duration of the step-803 current temporal intersection to the duration of the associated activity occurrence of the step-801 activity timeline. Multiplication by the duration ratio may account for those activity values that should be apportioned on a time basis (e.g., widgets produced). In the illustrated embodiment, step 806 sets the activity fatigue level of the newly created block 804 activity record to be the period fatigue level of the fatigue period that results in the current block 803 temporal intersection. Step 807 repeat steps 805 and 806 for each of the block 803 temporal intersections. The resulting newly created activity record(s) may then be passed to step 101 of method 100.

FIG. 10 is a flowchart illustrating method 1000 for applying a mathematical fatigue model to work history data pertaining to an individual to generate activity period start times, activity period stop times, and period fatigue levels of the individual. Method 1000 provides additional details of step 802 (receive fatigue timelines) of method 800. It begins with step 1001 in which work history data is received or otherwise provided (e.g. work schedules, shift data etc.). In particular embodiments, step-1001 work history data may be input by a user, retrieved from a database, supplied by another computer or network, and/or the like. In other embodiments, the step-1001 work history data is estimated by applying a sleep-estimation mathematical model to a received activity occurrence timeline, as described in more detail below with reference to FIG. 11.

Step 1002 creates a hypothetical sleep schedule from the step-1001 received work history data. There are several techniques to predict hypothetical sleep schedules from known work history data. Non-limiting examples of such techniques include: heuristic rules for inferring sleep schedules from sleep intervals (e.g., an 8 hour sleep interval ends approximately 1.5 hours before a work interval starts; etc.), statistical sampling of an individual's work history data to identify likely sleep intervals (e.g., identification of consistent 12 hour or longer periods where regular sleep is likely), and/or the like.

Method 1000 continues in step 1003, which involves applying a mathematical fatigue model to the step-1002 hypothetical sleep schedule. The step-1003 mathematical fatigue model may use hypothetical sleep and wake times as inputs to predict fatigue levels at discrete time points. A non-limiting example of a fatigue model that receives sleep and wake history as inputs and determines fatigue level predictions as output is the aforementioned two-process model of sleep regulation (Borbély, A., Achermann, P., "Sleep Homeostatis and Models of Sleep Regulation." Journal of Biological Rhythms 14 (6): 559-568, 1999) (previously incorporated herein by reference). In particular embodiments, output from the step-1003 mathematical fatigue model is classified into discrete fatigue levels (for example low, moderate, and high levels of fatigue). In other particular embodiments the output is a continuous measure equal to the fatigue model prediction (only discretized for implementation by a computer).

Step 1004 then generates fatigue periods with fatigue start times, fatigue stop times, and period fatigue levels for each point in time when the step-1003 predicted fatigue level changes. The step-1004 fatigue periods may then be used in step 803 of method 800 to find temporal intersections as described above.

FIG. 11 is a flowchart illustrating method 1100 for applying a sleep-estimation mathematical model to a received activity occurrence timeline to identify a plurality of past sleep periods. Method 1100 commences with step 1101, which involves receiving or otherwise providing an activity occurrence timeline. Step 1102 creates a work schedule from the step-1101 activity occurrence timeline by creating work intervals based on the start and end times of each activity period. Step 1103 applies a sleep-estimation mathematical model to the work schedule. The step-1103 sleep-estimation mathematical model receives, as input, an individual's work schedule with work start and end times and outputs an estimate of sleep timing and duration. The step-1103 sleep-estimation mathematical model may comprise one or more heuristic rules for assessing likely sleep periods from work schedules, predictive models of sleep propensity based upon work schedules, and/or the like. By way of non-limiting example, for individuals working a typical workshift from 9 AM to 5 PM it is common for a sleep period of eight (8) hours to end roughly 1.5 hours before a scheduled workshift. By way of second non-limiting example, for any other type of workshift (e.g. second shift, graveyard shift) it is common for an individual to sleep for approximately one half of his or her available free time. Results from application of the step-1103 model are then accumulated in step 1104 and comprise an estimated schedule of a plurality of past sleep periods. These step-1104 results may then be used in step 1001 of method 1000.

Figure 12A:
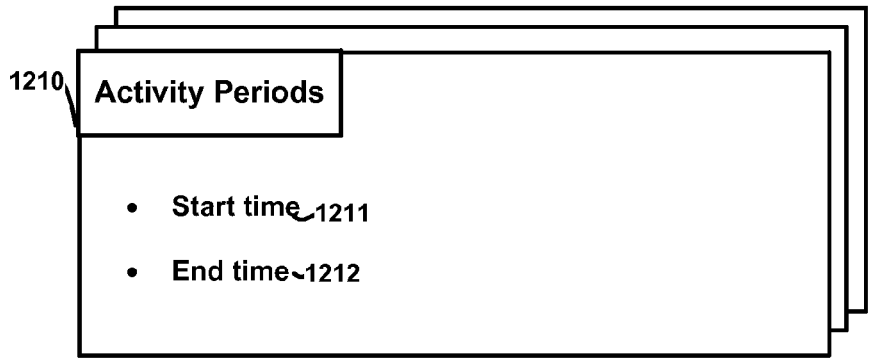
FIGS. 12A, 12B, and 12C provide an example set of optional data records and data fields for representing activity periods, fatigue periods, and an individual profile, respectively, as used in particular embodiments of the foregoing methods.
Figure 12B:
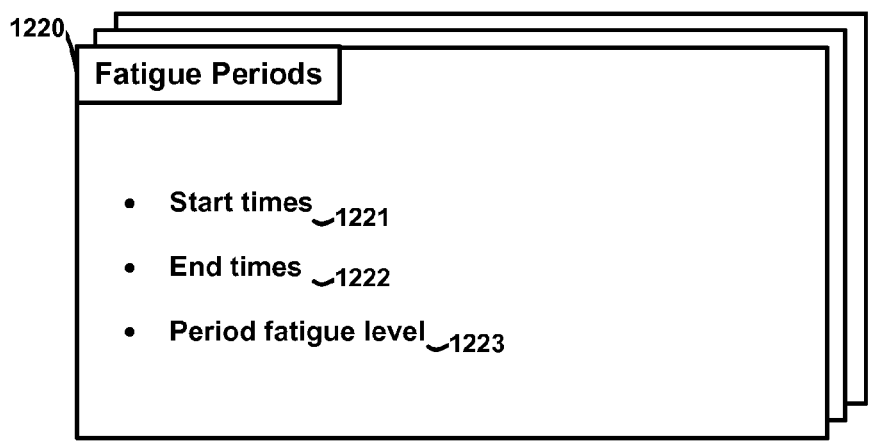

FIGS. 12A and 12B illustrates a non-limiting sample set of data records and data fields as might be used by methods 800, 1000, 1100 to represent activity periods 1210 and fatigue periods 1220, respectively, in a particular embodiment. Sample activity period record 1210, which may represent an activity period as identified by elements 911a, 911b, 911c of FIG. 9, may comprise, in particular embodiments, a start time 1211, an end time 1212, and one or more optional data fields (not shown). Sample fatigue period record 1220, which may represent a fatigue period as identified by elements 921a, 921b, 921c of FIG. 9 and in step 1003 of method 1000, may comprise, in particular embodiments, a fatigue start time 1221, a fatigue end time 1222, a period fatigue level 1223, and one or more optional data fields (not shown).

Figure 12C:
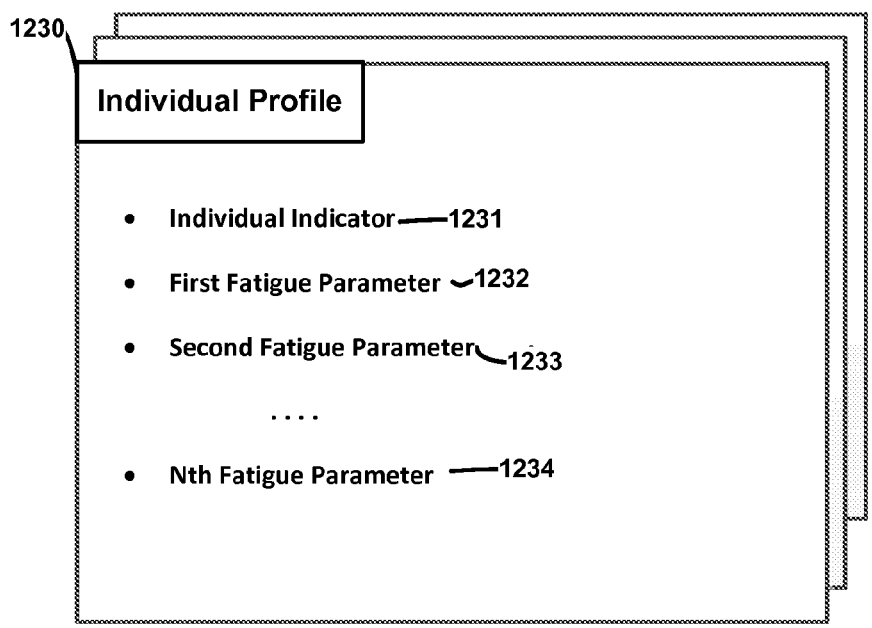

FIG. 12C illustrates a non-limiting sample set of data records and data fields as might be used by particular embodiments to encapsulate an individual profile 1230. Individual profile 1230 contains a collection of fatigue parameters 1232, 1333, 1234 that represent inputs to one or more mathematical fatigue models, including any of the mathematical fatigue models of the foregoing discussion, including but not limited to the Borbely two-process fatigue model, the step-1003 fatigue model of process 1000 (FIG. 10), the step-1103 sleep estimation fatigue model of process 1100 (FIG. 11), and/or the like. An individual indicator field 1231 is provided to associate individual profile 1230 to a specific individual.

Figure 13:
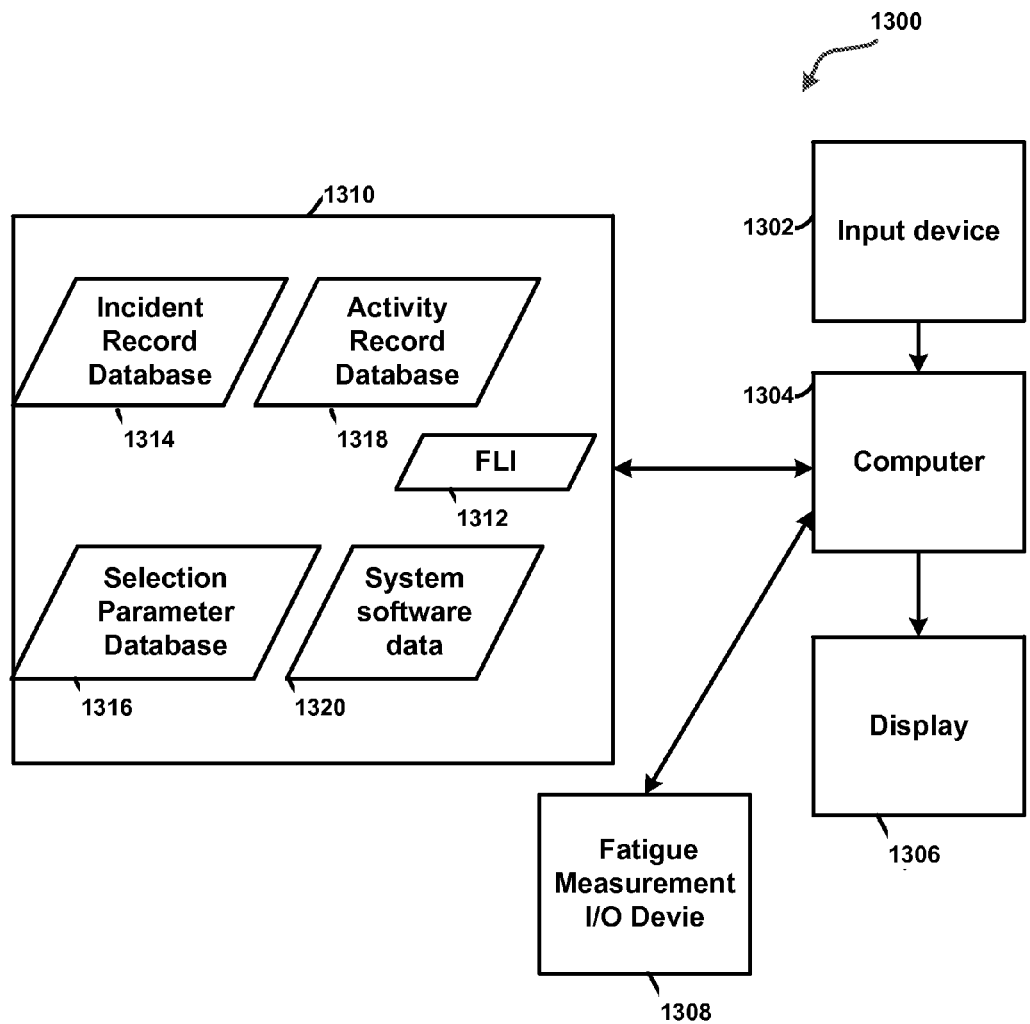
FIG. 13 is a schematic diagram of a system that may be used for implementing the methods described herein according to a particular embodiment.

FIG. 13 is a schematic diagram of a system 1300 which may be used for implementing some of the methods described herein according to particular embodiments. For brevity, some well understood components of system 1300 are not shown in the FIG. 13 schematic illustration, but will be understood by those skilled in the art. System 1300 comprises a suitably programmed computer 1304 having a suitable input device 1302 and a monitor display 1306. Input device 1302 may comprise any suitable input device capable of interacting with computer 1304, including without limitation keyboards, pointing devices, touch screens, and voice input and/or the like. Computer 1304 may be configured for network communications with one or more local area networks (LANs) and/or wide area networks (WANs) (not shown). In the illustrated embodiment, system 1300 also comprises an optional fatigue measurement I/O device 1308 which may be used to measure or sense one or more parameters of an individual which may be indicative of the individual's fatigue level.

Computer 1304 of the illustrated embodiment has access (locally or through a network) to data store 1310. Data store 1310 may store data records and selection parameters for the operation of the various methods described herein. The illustrated embodiment, data store 1310 is shown to include: incident record database 1314 comprising incident records 201 (FIG. 2A), selection parameter database 1316 comprising selection parameter records 220 (FIG. 2C), activity record database 1318 containing activity records 210 (FIG. 3B), system software data 1320 which may include programs operating on computer 1304 and/or the like.

Certain implementations of the invention comprise computers and/or computer processors which execute software instructions which cause the processors to perform a method of the invention. For example, one or more processors in a system may implement data processing blocks in the methods described herein by executing software instructions retrieved from a program memory accessible to the processors. The invention may also be provided in the form of a program product. The program product may comprise any non-transitory medium which carries a set of computer-readable instructions that, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs and DVDs, electronic data storage media including ROMs, flash RAM, or the like. The instructions may be present on the program product in encrypted and/or compressed formats.

Certain implementations of the invention may comprise transmission of information across networks, and distributed computational elements which perform one or more methods of the inventions. Such a system may enable a distributed team of operational planners and monitored individuals to utilize the information provided by the invention. A networked system may also allow individuals to utilize a graphical interface, printer, or other display device to receive personal alertness predictions and/or recommended future inputs through a remote computational device. Such a system would advantageously minimize the need for local computational devices.

Certain implementations of the invention may comprise exclusive access to the information by the individual subjects. Other implementations may comprise shared information between the subject's employer, commander, flight surgeon, scheduler, or other supervisor or associate, by government, industry, private organization, and/or the like, or by any other individual given permitted access.

Certain implementations of the invention may comprise the disclosed systems and methods incorporated as part of a larger system to support rostering, monitoring, selecting or otherwise influencing individuals and/or their environments. Information may be transmitted to human users or to other computerized systems.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e. that is functionally equivalent), including components that are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

The systems and methods of various embodiments may be extended to include other measures of human performance such as gross-motor strength, dexterity, endurance, or other physical measures. For example, fatigue may be replaced by one or more other types of neurobehavioral performance such as "sleepiness", "alertness", "tiredness", "cognitive performance", "cognitive throughput", and/or the like.

Other models or estimation procedures may be included to deal with biologically active agents, external factors, or other identified or as yet unknown factors affecting alertness/fatigue.

What is claimed is:

1. A method, using a computer, for determining a normalized contextual performance metric for quantifying with historical fatigue-incident data the operational risk to an enterprise caused by one or more individuals within the workforce of the enterprise attaining specified fatigue levels, using a computer, the method comprising:

[1] for each of one or more individuals:

[1.1] providing, at the computer, an individual's activity occurrence timeline comprising one or more activity periods, each activity period comprising a start time corresponding to the start time of an activity occurrence, and an end time corresponding to the end time of the activity occurrence, and a period activity value that is a magnitude of at least one measurable characteristic of the activity occurrence, wherein, for at least one activity period, the measurable characteristic of the activity occurrence is one or more of: time worked, distance traveled, rate of production, production efficiency, production quantity, production quality, tasks performed, inventory consumed, and freight moved, the activity occurrence corresponding to a particular work activity occurring contiguously within a workshift of the individual;

[1.2] providing, at the computer, the individual's fatigue timeline comprising at least in part one or more fatigue periods, each fatigue period comprising a start time, an end time, and a period fatigue level corresponding to a neurobehavioral state of the individual during the fatigue period;

[1.3] determining, by the computer, all temporal intersections of the activity periods and the fatigue periods, such that each temporal intersection comprises a start time, an end time, and is associated with an activity period and a fatigue period;

[1.4] for each of the temporal intersections, creating an activity record, by the computer, the activity record parameterized by: an activity fatigue level and an activity value; wherein the activity fatigue level is the period fatigue level of the fatigue period associated with the temporal intersection, and wherein the activity value is the period activity value of the activity period associated with the temporal intersection multiplied by a ratio of a duration of the temporal intersection to a duration of the activity period;

[2] providing, by a computer, one or more incident records, wherein each incident record represents an incident occurrence and is parameterized by: an incident value that is a measurable characteristic of the incident occurrence, wherein for each incident record, the incident value is a one of: an economic cost, a legal or administrative compliance status rating, a customer satisfaction rating, an economic performance rating, a lost productivity cost, ad administrative burden, a number of injuries caused, a number of injuries caused by a specific severity, an incident severity level, a count of events related to the incident, a quality rating of products or services, and an employee productivity rating; and an incident fatigue level that is a neurobehavioral state, corresponding to the time of the incident occurrence, of one or more individuals associated with the incident occurrence;

[3] selecting, by the computer, one or more activity records from among the created activity records, wherein the selected activity records are parameterized by activity fatigue levels within a fatigue level range of interest;

[4] selecting, by the computer, one or more incident records from among the provided incident records, wherein the selected incident records are parameterized by incident fatigue levels within the fatigue level range of interest; and

[5] determining, by the computer, a normalized contextual performance metric for the fatigue level range of interest, the normalized contextual performance metric comprising a sum of the incident values of the selected incident records divided by a sum of the activity values of the selected activity records.

2. The method of claim 1 further comprising:

[6] storing in a database associated with the computer one or more of: the one or more created activity records and the one or more provided incident records;

wherein selecting one or more activity records from among the created activity records comprises selecting one or more of the activity records stored in the database; and wherein selecting one or more incident records from among the provided incident records comprises selecting one or more of the incident records stored in the database.

3. The method of claim 1 wherein, for each incident record, the cost comprises an economic cost associated with the incident occurrence, and the incident value is positively correlated with the economic cost.

4. The method of claim 1 wherein, for at least one activity period the measurable characteristic of the activity occurrence is based, at least in part, on a time duration associated with the activity occurrence.

5. The method of claim 1 wherein the incident values for the provided incident records are the same, such that the sum of the incident values of the selected incident records is proportional to the number of selected incident records.

6. The method of claim 1:

wherein, for each incident record, the incident record is further parameterized by an activity classification which classifies an activity occurrence associated with the incident occurrence represented by associated with the incident record;

wherein, for each activity record, the activity record is further parameterized by an activity classification which classifies the activity occurrence associated with the activity record;

wherein selecting the one or more activity records from among the created activity records comprises selecting those activity records with activity classifications corresponding to an activity classification of interest; and wherein selecting the one or more incident records from among the provided incident records comprises selecting those incident records with activity classifications corresponding to the activity classification of interest.

7. The method of claim 6 wherein, for each activity record and for each incident record, the activity classification is based, at least in part, on one or more of: an activity type and an activity environment.

8. The method of claim 1 wherein, for each activity record, the activity record is further parameterized by an individual indicator indicative of the individual.

9. The method of claim 1 wherein, for each activity record, the activity fatigue level is based at least in part on a sleep schedule of the individual.

10. The method of claim 1 wherein, for one or more of the fatigue periods, the period fatigue level corresponding to a neurobehavioral state of the individual during the fatigue period is determined based at least in part upon a mathematical fatigue model, and wherein the mathematical-fatigue model accepts as inputs one or more fatigue parameters relating to the individual.

11. The method of claim 10 wherein the one or more fatigue parameters relating to the individual comprise an individual profile.

12. The method of claim 10 wherein the one or more fatigue parameters relating to the individual comprise one or more of: actigraphy data, fatigue test data, sleep schedule data, work schedule data, and one or more neurobehavioral trait parameters.

13. The method of claim 1 wherein, for one or more of the fatigue periods, the period fatigue level corresponding to a neurobehavioral state of the individual during the fatigue period is determined by results of a stimulus-response test.

14. The method of claim 13 wherein the stimulus-response test is a psychomotor vigilance task.

15. The method of claim 1 further comprising:

[7] receiving the fatigue level range of interest from a user.

16. The method of claim 1 wherein the fatigue level range of interest comprises a single discrete fatigue level.

17. The method of claim 1:

wherein, for each activity record and each incident record, the activity fatigue level and the incident fatigue level are respectively represented by discrete fatigue values;

wherein the fatigue level range of interest spans a plurality of discrete fatigue values; and wherein the method further comprises:

[8] determining a range of normalized contextual performance metrics by repeating steps [3], [4], and [5] for each discrete fatigue value within the fatigue level range of interest.

18. The method of claim 1 wherein, for each incident record, the incident fatigue level comprises an average of the neurobehavioral states of the one or more individuals associated with the incident occurrence.

19. The method of claim 1 wherein at least one of the one or more provided incident records comprises an activity-related incident record which represents an incident occurrence associated with one or more corresponding activity occurrences represented by one or more corresponding incident-related activity records from among the one or more created activity records.

20. The method of claim 19 wherein, for each activity-related incident record, the incident fatigue level is determined as a function of the one or more activity fatigue levels which parameterize the one or more corresponding incident-related activity records.

21. The method of claim 20 wherein the function of the one or more activity fatigue levels comprises a sum of the one or more activity fatigue levels.

22. The method of claim 20 wherein the function of the one or more activity fatigue levels comprises an average of the one or more activity fatigue levels.

23. The method of claim 20 wherein the function of the one or more activity fatigue levels comprises an average of the one or more activity fatigue levels weighted by the one or more activity values which parameterize the one or more corresponding incident-related activity records.

24. The method of claim 1:

wherein providing the one or more incident records comprises receiving the incident records corresponding to a first set of individuals over a first time period of interest; and wherein creating one or more activity records comprises creating activity records corresponding to a second set of individuals over a second time period of interest.

25. The method of claim 24 further comprising:
[8] multiplying, by the computer, the determined normalized contextual performance metric by a scaling factor to obtain a scaled normalized contextual performance metric.

26. The method of claim 25 wherein the scaling factor is based, at least in part, on a ratio of a duration of the second time period of interest to a duration of the first time period of interest.

27. The method of claim 24 wherein the first time period of interest and the second time period of interest are the same time period.

28. The method of claim 25 wherein the scaling factor is based, at least in part, on a ratio of a number of individuals in the second set of individuals to a number of individuals in the first set of individuals.

29. The method of claim 24 wherein at least one individual within the first set of individuals is also an individual within the second set of individuals.

30. The method of claim 24 wherein the first set of individuals comprises a workforce.

31. The method of claim 1 wherein the period fatigue level is a constant.

32. The method of claim 1 wherein the period fatigue level comprises a fatigue level range.

33. The method of claim 1 wherein providing the individual's fatigue timeline comprises obtaining data indicative of the individual's sleep history and applying a mathematical fatigue model to the data indicative of the individual's sleep history to generate therefrom the start times, stop times and period fatigue levels of the one or more fatigue periods which make up the individual's fatigue timeline.

34. The method of claim 33 wherein the data indicative of the individual's sleep history comprises a plurality of past sleep periods, each past sleep period comprising: a sleep onset time when the individual goes to sleep and sleep end time when the individual wakes up.

35. The method of claim 34 wherein obtaining the data indicative of the individual's sleep history comprises applying a sleep estimation mathematical model to the individual's activity occurrence timeline, the sleep estimation mathematical model estimating a plurality of past sleep periods based on the start times and end times of the activity periods of the individual's activity occurrence timeline.

36. A computer program product embodied in a non-transitory medium and comprising computer-readable instructions which, when executed by a suitable computer, cause the computer to perform a method for calculating a normalized contextual performance metric for quantifying with historical fatigue-incident data the operational risk to an enterprise caused by one or more individuals within the workforce of the enterprise attaining specified fatigue levels, using a computer, the method comprising:
[1] for each of one or more individuals:
  [1.1] providing, at the computer, an individual's activity occurrence timeline comprising one or more activity periods, each activity period comprising a start time corresponding to the start time of an activity occurrence, and an end time corresponding to the end time of the activity occurrence, and a period activity value that is a magnitude of at least one measurable characteristic of the activity occurrence, wherein, for at least one activity period, the measurable characteristic of the activity occurrence is one or more of: time worked, distance traveled, rate of production, production efficiency, production quantity, production quality, tasks performed, inventory consumed, and freight moved, the activity occurrence corresponding to a particular work activity occurring contiguously within a workshift of the individual;
  [1.2] providing, at the computer, the individual's fatigue timeline comprising at least in part one or more fatigue periods, each fatigue period comprising a start time, an end time, and a period fatigue level corresponding to a neurobehavioral state of the individual during the fatigue period;
  [1.3] determining, by the computer, all temporal intersections of the activity periods and the fatigue periods, such that each temporal intersection comprises a start time, an end time, and is associated with an activity period and a fatigue period;
  [1.4] for each of the temporal intersections, creating an activity record, by the computer, the activity record parameterized by: an activity fatigue level and an activity value; wherein the activity fatigue level is the period fatigue level of the fatigue period associated with the temporal intersection, and wherein the activity value is the period activity value of the activity period associated with the temporal intersection multiplied by a ratio of a duration of the temporal intersection to a duration of the activity period;
[2] providing, by a computer, one or more incident records, wherein each incident record represents an incident occurrence and is parameterized by: an incident value that is a measurable characteristic of the incident occurrence, wherein for each incident record, the incident value is a one of: an economic cost, a legal or administrative compliance status rating, a customer satisfaction rating, an economic performance rating, a lost productivity cost, ad administrative burden, a number of injuries caused, a number of injuries caused by a specific severity, an incident severity level, a count of events related to the incident, a quality rating of products or services, and an employee productivity rating; and an incident fatigue level that is a neurobehavioral state, corresponding to the time of the incident occurrence, of one or more individuals associated with the incident occurrence;
[3] selecting, by the computer, one or more activity records from among the created activity records, wherein the selected activity records are parameterized by activity fatigue levels within a fatigue level range of interest;
[4] selecting, by the computer, one or more incident records from among the provided incident records, wherein the selected incident records are parameterized by incident fatigue levels within the fatigue level range of interest; and
[5] determining, by the computer, a normalized contextual performance metric for the fatigue level range of interest, the normalized contextual performance metric comprising a sum of the incident values of the selected incident records divided by a sum of the activity values of the selected activity records.

* * * * *